(12) United States Patent
Snow

(10) Patent No.: US 11,170,366 B2
(45) Date of Patent: Nov. 9, 2021

(54) PRIVATE BLOCKCHAIN SERVICES

(71) Applicant: Factom, Austin, TX (US)

(72) Inventor: Paul Snow, Austin, TX (US)

(73) Assignee: Inveniam Capital Partners, Inc., New York, NY (US)

( * ) Notice: Subject to any disclaimer, the term of this patent is extended or adjusted under 35 U.S.C. 154(b) by 231 days.

(21) Appl. No.: 15/983,655

(22) Filed: May 18, 2018

(65) Prior Publication Data

US 2019/0354964 A1   Nov. 21, 2019

(51) Int. Cl.

| | | |
|---|---|---|
| *G06Q 20/40* | (2012.01) | |
| *G06Q 30/02* | (2012.01) | |
| *G06Q 20/32* | (2012.01) | |
| *G06Q 20/34* | (2012.01) | |
| *G06Q 20/38* | (2012.01) | |
| *H04L 9/06* | (2006.01) | |
| *G06F 16/27* | (2019.01) | |
| *G06F 16/907* | (2019.01) | |
| *G06F 16/18* | (2019.01) | |

(52) U.S. Cl.
CPC ....... *G06Q 20/382* (2013.01); *G06F 16/1805* (2019.01); *G06F 16/27* (2019.01); *G06F 16/907* (2019.01); *H04L 9/0643* (2013.01); *H04L 2209/38* (2013.01); *H04L 2209/56* (2013.01)

(58) Field of Classification Search
CPC .... G06Q 20/00–425; G06F 16/00–986; H04L 9/00–38; H04L 2209/00–88
See application file for complete search history.

(56) References Cited

U.S. PATENT DOCUMENTS

| | | | |
|---|---|---|---|
| 4,309,569 A | 6/1982 | Merkle | |
| 5,499,294 A | 3/1996 | Friedman | |
| 5,862,218 A | 1/1999 | Steinberg | |
| 5,966,446 A | 10/1999 | Davis | |
| 7,028,263 B2 * | 4/2006 | Maguire | ........... H04M 1/72547 715/758 |

(Continued)

FOREIGN PATENT DOCUMENTS

| | | |
|---|---|---|
| CN | 110392052 | 10/2019 |
| FI | DE 10128728 | 1/2003 |

(Continued)

OTHER PUBLICATIONS

Ron White, How Computers Work, Oct. 2003, QUE, Seventh Edition (Year: 2003).*

(Continued)

*Primary Examiner* — John W Hayes
*Assistant Examiner* — Chenyuh Kuo
(74) *Attorney, Agent, or Firm* — Scott P. Zimmerman, PLLC

(57) ABSTRACT

A personal blockchain is generated as a cloud-based software service in a blockchain environment. The personal blockchain immutably archives usage of any device, perhaps as requested by a user. However, some of the usage may be authorized for public disclosure, while other usage may be designated as private and restricted from public disclosure. The public disclosure may permit public ledgering by still other blockchains, thus providing two-way public/private ledgering for improved record keeping. Private usage, though, may only be documented by the personal blockchain.

9 Claims, 39 Drawing Sheets

(56) References Cited

U.S. PATENT DOCUMENTS

| | | |
|---|---|---|
| 7,212,808 B2 * | 5/2007 | Engstrom .............. H04W 88/02 455/412.1 |
| 7,272,179 B2 | 9/2007 | Siemens et al. |
| 7,572,179 B2 | 8/2009 | Choi et al. |
| 7,729,950 B2 | 6/2010 | Mendizabal et al. |
| 8,245,038 B2 | 8/2012 | Golle et al. |
| 8,266,439 B2 | 9/2012 | Haber et al. |
| 8,442,903 B2 | 5/2013 | Zadoorian et al. |
| 8,560,722 B2 | 10/2013 | Gates et al. |
| 8,706,616 B1 | 4/2014 | Flynn |
| 8,712,887 B2 | 4/2014 | DeGroeve et al. |
| 8,867,741 B2 | 10/2014 | McCorkindale et al. |
| 8,943,332 B2 | 1/2015 | Horne et al. |
| 9,124,423 B2 | 9/2015 | Jennas, II et al. |
| 9,378,343 B1 | 6/2016 | David et al. |
| 9,396,006 B2 | 7/2016 | Kundu et al. |
| 9,407,431 B2 | 8/2016 | Bellare et al. |
| 9,411,524 B2 | 8/2016 | O'Hare et al. |
| 9,411,976 B2 | 8/2016 | Irvine |
| 9,411,982 B1 | 8/2016 | Dippenaar et al. |
| 9,424,576 B2 | 8/2016 | Vandervort |
| 9,436,935 B2 | 9/2016 | Hudon |
| 9,472,069 B2 | 10/2016 | Roskowski |
| 9,489,827 B2 | 11/2016 | Quinn et al. |
| 9,584,493 B1 | 2/2017 | Leavy |
| 9,722,790 B2 | 8/2017 | Ebrahimi |
| 9,876,646 B2 | 1/2018 | Ebrahimi |
| 9,882,918 B1 | 1/2018 | Ford et al. |
| 10,135,607 B1 | 11/2018 | Roets |
| 10,163,080 B2 | 12/2018 | Chow |
| 2003/0018563 A1 | 1/2003 | Kilgour et al. |
| 2004/0085445 A1 | 5/2004 | Park |
| 2005/0206741 A1 | 9/2005 | Raber |
| 2006/0075228 A1 | 4/2006 | Black et al. |
| 2006/0184443 A1 | 8/2006 | Erez et al. |
| 2007/0094272 A1 | 4/2007 | Yeh |
| 2007/0174630 A1 | 7/2007 | Shannon |
| 2007/0296817 A1 | 12/2007 | Ebrahimi et al. |
| 2008/0010466 A1 | 1/2008 | Hopper |
| 2008/0028439 A1 | 1/2008 | Shevade |
| 2008/0059726 A1 | 3/2008 | Rozas |
| 2009/0025063 A1 | 1/2009 | Thomas |
| 2009/0287597 A1 | 11/2009 | Bahar |
| 2010/0049966 A1 | 2/2010 | Kato |
| 2010/0058476 A1 | 3/2010 | Isoda |
| 2010/0161459 A1 | 6/2010 | Kass et al. |
| 2010/0228798 A1 | 9/2010 | Kodama |
| 2010/0241537 A1 | 9/2010 | Kass et al. |
| 2011/0061092 A1 | 3/2011 | Bailloeul |
| 2011/0161674 A1 | 6/2011 | Ming |
| 2012/0203670 A1 | 8/2012 | Piersol |
| 2013/0142323 A1 | 6/2013 | Chiarella |
| 2013/0222587 A1 | 8/2013 | Roskowski |
| 2013/0276058 A1 | 10/2013 | Buldas |
| 2014/0201541 A1 | 7/2014 | Paul |
| 2014/0022973 A1 | 8/2014 | Sato |
| 2014/0282852 A1 * | 9/2014 | Vestevich ........... G06F 21/6263 726/1 |
| 2014/0289802 A1 * | 9/2014 | Lee ...................... H04L 63/102 726/3 |
| 2014/0344015 A1 | 11/2014 | Puertolas-Montasnes et al. |
| 2015/0193633 A1 | 7/2015 | Chida |
| 2015/0206106 A1 | 7/2015 | Yago |
| 2015/0244729 A1 | 8/2015 | Mao |
| 2015/0378627 A1 | 12/2015 | Kitazawa |
| 2015/0379484 A1 | 12/2015 | McCarthy |
| 2016/0071096 A1 | 3/2016 | Rosca |
| 2016/0098578 A1 | 4/2016 | Hincker |
| 2016/0119134 A1 | 4/2016 | Hakoda et al. |
| 2016/0148198 A1 | 5/2016 | Kelley |
| 2016/0162897 A1 | 6/2016 | Feeney |
| 2016/0217436 A1 | 7/2016 | Brama |
| 2016/0239653 A1 | 8/2016 | Loughlin-Mchugh et al. |
| 2016/0253663 A1 | 9/2016 | Clark et al. |
| 2016/0260091 A1 | 9/2016 | Tobias |
| 2016/0267472 A1 | 9/2016 | Lingham et al. |
| 2016/0267558 A1 | 9/2016 | Bonnell et al. |
| 2016/0275294 A1 | 9/2016 | Irvine |
| 2016/0283920 A1 | 9/2016 | Fisher et al. |
| 2016/0292396 A1 | 10/2016 | Akerwall |
| 2016/0292672 A1 | 10/2016 | Fay et al. |
| 2016/0292680 A1 | 10/2016 | Wilson, Jr. |
| 2016/0294783 A1 | 10/2016 | Piqueras Jover |
| 2016/0300200 A1 | 10/2016 | Brown et al. |
| 2016/0300234 A1 | 10/2016 | Moss-Pultz et al. |
| 2016/0321675 A1 | 11/2016 | McCoy et al. |
| 2016/0321751 A1 | 11/2016 | Creighton, IV et al. |
| 2016/0328791 A1 | 11/2016 | Parsells et al. |
| 2016/0330031 A1 | 11/2016 | Drego et al. |
| 2016/0330244 A1 | 11/2016 | Denton |
| 2016/0337119 A1 | 11/2016 | Hosaka et al. |
| 2016/0342977 A1 | 11/2016 | Lam |
| 2016/0342989 A1 | 11/2016 | Davis |
| 2016/0344737 A1 | 11/2016 | Anton et al. |
| 2016/0371771 A1 | 12/2016 | Serrano |
| 2017/0005797 A1 | 1/2017 | Lanc et al. |
| 2017/0033933 A1 | 2/2017 | Haber |
| 2017/0053249 A1 | 2/2017 | Tunnell et al. |
| 2017/0000613 A1 | 3/2017 | Melika et al. |
| 2017/0075938 A1 | 3/2017 | Black |
| 2017/0124534 A1 | 5/2017 | Savolainen |
| 2017/0124535 A1 | 5/2017 | Juels et al. |
| 2017/0161439 A1 | 6/2017 | Raduchel |
| 2017/0177898 A1 * | 6/2017 | Dillenberger .......... G06Q 50/01 715/733 |
| 2017/0178237 A1 | 6/2017 | Wong |
| 2017/0213287 A1 | 7/2017 | Bruno |
| 2017/0221052 A1 | 8/2017 | Sheng |
| 2017/0243208 A1 | 8/2017 | Kurian et al. |
| 2017/0243289 A1 | 8/2017 | Rufo |
| 2017/0244757 A1 | 8/2017 | Castinado et al. |
| 2017/0330279 A1 | 11/2017 | Ponzone |
| 2017/0352031 A1 | 12/2017 | Collin |
| 2017/0373859 A1 | 12/2017 | Shors et al. |
| 2018/0075239 A1 | 3/2018 | Boutnaru |
| 2018/0075527 A1 | 3/2018 | Nagla et al. |
| 2018/0091524 A1 | 3/2018 | Setty |
| 2018/0097779 A1 | 4/2018 | Karame et al. |
| 2018/0101701 A1 | 4/2018 | Barinov |
| 2018/0139042 A1 | 5/2018 | Binning |
| 2018/0157700 A1 | 6/2018 | Roberts |
| 2018/0167201 A1 | 6/2018 | Naqvi |
| 2018/0173906 A1 | 6/2018 | Rodriguez |
| 2018/0176017 A1 | 6/2018 | Rodriguez |
| 2018/0181768 A1 | 6/2018 | Leporini |
| 2018/0182042 A1 | 6/2018 | Vinay |
| 2018/0189333 A1 | 7/2018 | Childress |
| 2018/0189781 A1 | 7/2018 | McCann |
| 2018/0204213 A1 | 7/2018 | Zappier |
| 2018/0219683 A1 | 8/2018 | Peery |
| 2018/0219685 A1 | 8/2018 | Deery |
| 2018/0225640 A1 | 8/2018 | Chapman |
| 2018/0241565 A1 | 8/2018 | Paolini-Subramanya |
| 2018/0260888 A1 | 9/2018 | Paolini-Subramanya |
| 2018/0260889 A1 | 9/2018 | Paolini-Subramanya |
| 2018/0268162 A1 | 9/2018 | Dillenberger |
| 2018/0268382 A1 | 9/2018 | Wasserman |
| 2018/0268504 A1 | 9/2018 | Paolini-Subramanya |
| 2018/0276668 A1 | 9/2018 | Li |
| 2018/0276745 A1 | 9/2018 | Paolini-Subramanya |
| 2018/0285970 A1 | 10/2018 | Snow |
| 2018/0285971 A1 | 10/2018 | Rosenoer |
| 2018/0316502 A1 | 11/2018 | Nadeau |
| 2019/0018947 A1 | 1/2019 | Li |
| 2019/0036887 A1 * | 1/2019 | Miller ................... H04L 9/3297 |
| 2019/0043048 A1 | 2/2019 | Wright |
| 2019/0044727 A1 | 2/2019 | Scott |
| 2019/0087446 A1 | 3/2019 | Sharma |
| 2019/0123889 A1 | 4/2019 | Schmidt-Karaca |
| 2019/0197532 A1 | 6/2019 | Jayachandran |
| 2019/0205563 A1 | 7/2019 | Gonzales, Jr. |
| 2019/0251557 A1 | 8/2019 | Jin |
| 2019/0253258 A1 | 8/2019 | Thekadath |
| 2019/0268141 A1 | 8/2019 | Pandurangan |

(56) References Cited

U.S. PATENT DOCUMENTS

| | | |
|---|---|---|
| 2019/0268163 A1 | 8/2019 | Nadeau |
| 2019/0281259 A1 | 9/2019 | Palazzolo |
| 2019/0287107 A1 | 9/2019 | Gaur |
| 2019/0288832 A1 | 9/2019 | Dang |
| 2019/0324867 A1 | 10/2019 | Tang |
| 2019/0334715 A1 | 10/2019 | Gray |
| 2019/0342422 A1 | 11/2019 | Li |
| 2019/0347444 A1 | 11/2019 | Lowagie |
| 2019/0354606 A1 | 11/2019 | Snow |
| 2019/0354607 A1 | 11/2019 | Snow |
| 2019/0354611 A1 | 11/2019 | Snow |
| 2019/0354724 A1 | 11/2019 | Lowagie |
| 2019/0354725 A1 | 11/2019 | Lowagie |
| 2019/0354964 A1 | 11/2019 | Snow |
| 2019/0356733 A1 | 11/2019 | Snow |
| 2019/0391540 A1 | 12/2019 | Westervelt |
| 2019/0394044 A1 | 12/2019 | Snow |
| 2019/0394048 A1 | 12/2019 | Deery |
| 2020/0004946 A1 | 1/2020 | Gilpin |
| 2020/0034813 A1 | 1/2020 | Calinog |
| 2020/0004263 A1 | 2/2020 | Douglass |
| 2020/0042960 A1 | 2/2020 | Cook |
| 2020/0042982 A1 | 2/2020 | Snow |
| 2020/0042983 A1 | 2/2020 | Snow |
| 2020/0042984 A1 | 2/2020 | Snow |
| 2020/0042985 A1 | 2/2020 | Snow |
| 2020/0042986 A1 | 2/2020 | Snow |
| 2020/0042987 A1 | 2/2020 | Snow |
| 2020/0042988 A1 | 2/2020 | Snow |
| 2020/0042990 A1 | 2/2020 | Snow |
| 2020/0042995 A1 | 2/2020 | Snow et al. |
| 2020/0044827 A1 | 2/2020 | Snow |
| 2020/0044856 A1 | 2/2020 | Lynde |
| 2020/0044857 A1 | 2/2020 | Snow |
| 2020/0065761 A1 | 2/2020 | Tatchell |
| 2020/0089690 A1 | 3/2020 | Qiu |
| 2020/0099534 A1 | 3/2020 | Lowagie |
| 2020/0104712 A1 | 4/2020 | Katz |
| 2020/0145219 A1 | 5/2020 | Sebastian |
| 2020/0167870 A1 | 5/2020 | Isaacson |
| 2020/0175506 A1 | 6/2020 | Snow |
| 2020/0279324 A1 | 9/2020 | Snow |
| 2020/0279325 A1 | 9/2020 | Snow |
| 2020/0279326 A1 | 9/2020 | Snow |
| 2020/0280447 A1 | 9/2020 | Snow |

FOREIGN PATENT DOCUMENTS

| | | |
|---|---|---|
| JP | 5383297 | 1/2014 |
| KR | 100653512 | 12/2006 |
| KR | 101747221 | 6/2017 |
| WO | WO 0049797 | 8/2000 |
| WO | WO 2007069176 | 6/2007 |
| WO | WO 2015077378 | 5/2015 |
| WO | WO 2018013898 A1 | 1/2018 |
| WO | WO 2018109010 | 6/2018 |

OTHER PUBLICATIONS

Unkown, "Federated Learning: Collaborative Machine Learning without Centralized Training Data" Apr. 6, 2017, 11 pages.

Casey, "BitBeat: Factom Touts Blockchain Tool for Keeping Record Keepers Honest", Wall Street Journal, Nov. 5, 2014.

Crosby, Michael et al., "BlockChain Technology, Beyond Bitcoin", Sutardja Center for Entrepreneurship & Technology, Berkeley Engineering, Oct. 16, 2015, 35 pages.

Al-Naji, Nader et al., "Basis: A Price-Stable Cryptocurrency with an Algorithmic Central Bank" www.basis.io Jun. 20, 2017, 27 pages.

Haarmann, et al., "DMN Decision Execution on the Ethereum Blockchain," Hasso Plattner Institute, University of Potsdam, 15 pages.

Kim et al., "A Perspective on Blockchain Smart Contracts," Schulich School of Business, York University, Toronto, Canada, 6 pages.

Menezes, Alfred. J., et al. "Handbook of Applied Cryptography," 1997, CRC Press, p. 527-528.

Watanabe, Hiroki, et al. "Blockchain contract: Securing a blockchain applied to smart contracts." *2016 IEEE International Conference on Consumer Electronics (ICCE)*. IEEE, 2016.

"BlockChain Technology", Berkeley Engineering.

Alsolami, Fahad, and Terrance E. Boult. "CloudStash: using secret-sharing scheme to secure data, not keys, in multi-clouds." *Information Technology: New Generations (ITNG), 2014 11th International Conference on*. IEEE, 2014.

"Midex", https://promo.midex.com/Midex_EN.pdf.

Xtrade White Paper, https://xtrade1-9649.kxcdn.com/wp-content/uploads/2017/09/xtrade-whitepaper.pdf.

Chakravorty, Antorweep, and Chunming Rong. "Ushare: user controlled social media based on blockchain." *Proceedings of the 11th International Conference on Ubiquitous Information Management and Communication*. ACM, 2017.

Chen, Zhixong, and Yixuan Zhu. "Personal Archive Service System using Blockchain Technology: Case Study, Promising and Challenging." AI & Mobile Services (ATMS), 2017 IEEE International Conference on. IEEE, 2017.

Luu et al., Making Smart Contracts Smarter, 2016.

* cited by examiner

PRIVATE BLOCKCHAIN SERVICES

CROSS-REFERENCE TO RELATED APPLICATIONS

This patent application relates to U.S. application Ser. No. 15/983,572 filed May 18, 2018, entitled "Private Cryptocoinage in Blockchain Environments", and incorporated herein by reference in its entirety. This patent application also relates to U.S. application Ser. No. 15/983,595 filed May 18, 2018, entitled "Load Balancing in Blockchain Environments", and incorporated herein by reference in its entirety. This patent application also relates to U.S. application Ser. No. 15/983,612 filed May 18, 2018, since issued as U.S. Pat. No. 10,783,164, and incorporated herein by reference in its entirety. This patent application also relates to U.S. application Ser. No. 15/983,632 filed May 18, 2018, entitled "Personal Blockchain Services", and incorporated herein by reference in its entirety.

BACKGROUND

Blockchain usage is growing. As cryptographic blockchain gains acceptance, improved techniques are needed to provide private record keeping.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
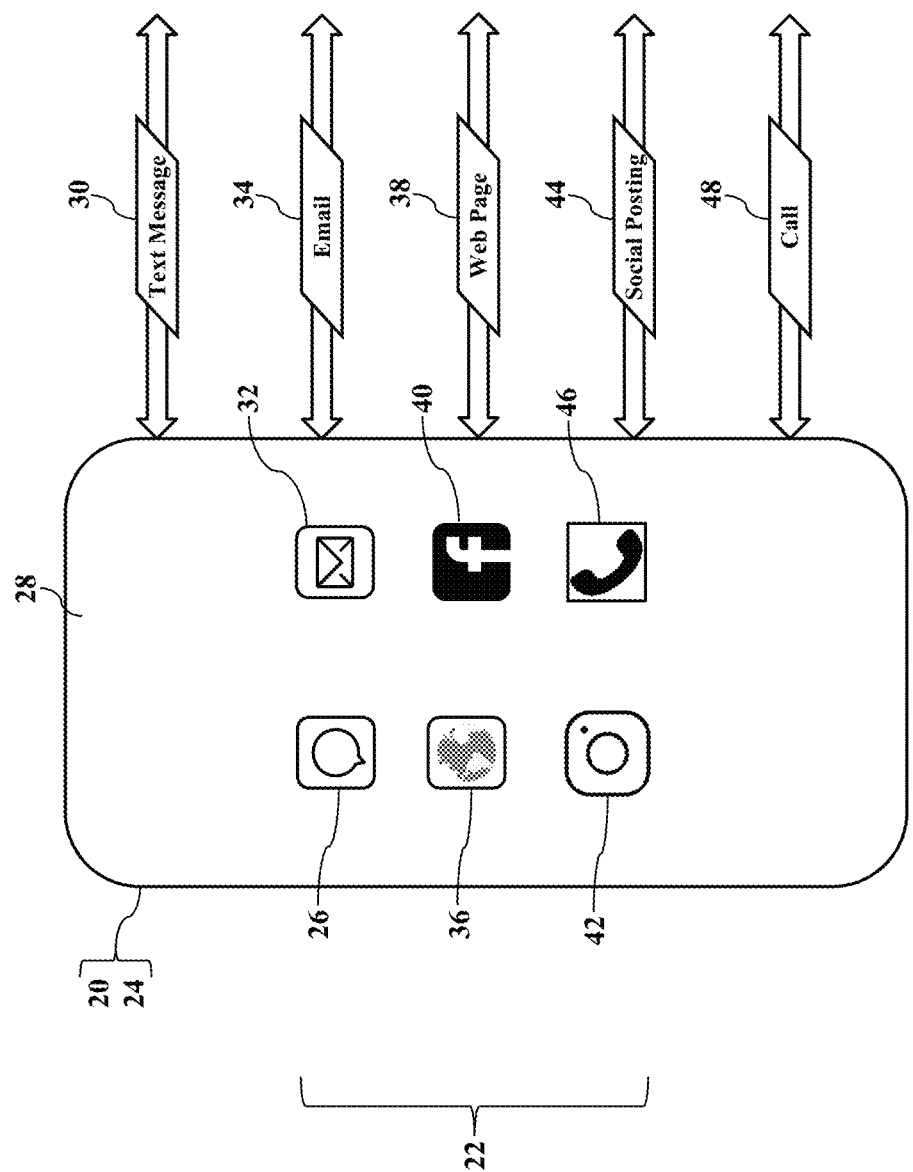
FIGS. 1-16 are simplified illustrations of a personal blockchain environment, according to exemplary embodiments.

FIGS. 1-16 are simplified illustrations of an operating environment, according to exemplary embodiments. A device 20 downloads, stores, and executes various software applications 22. While the device 20 may be any processor-controlled system, most readers are familiar with mobile computing. FIG. 1 thus illustrates the device 20 as a mobile smartphone 24, which many people use and carry. As the smartphone 24 operates, the smartphone 24 executes any of the software applications 22 to provide functions and services. For example, a messaging application (illustrated by a messaging icon 26 displayed by a display device 28) allows the smartphone 24 to send and receive text messages 30. An electronic mail application (illustrated by a mail icon 32) instructs the smartphone 24 to send and receive electronic mail 34. A web browser application (illustrated by a browser icon 36) allows the smartphone 24 to access the Internet and download web pages 38. Various other software applications 22 (such as FACEBOOK® and INSTAGRAM® icons 40 and 42) access social networking sites and upload/download social postings 44. A call application (illustrated by a call icon 46) causes the smartphone 24 to place/send and receive voice-over and telephony calls 48. These software applications 22 are merely some of the most common functions and services.

Figure 2:
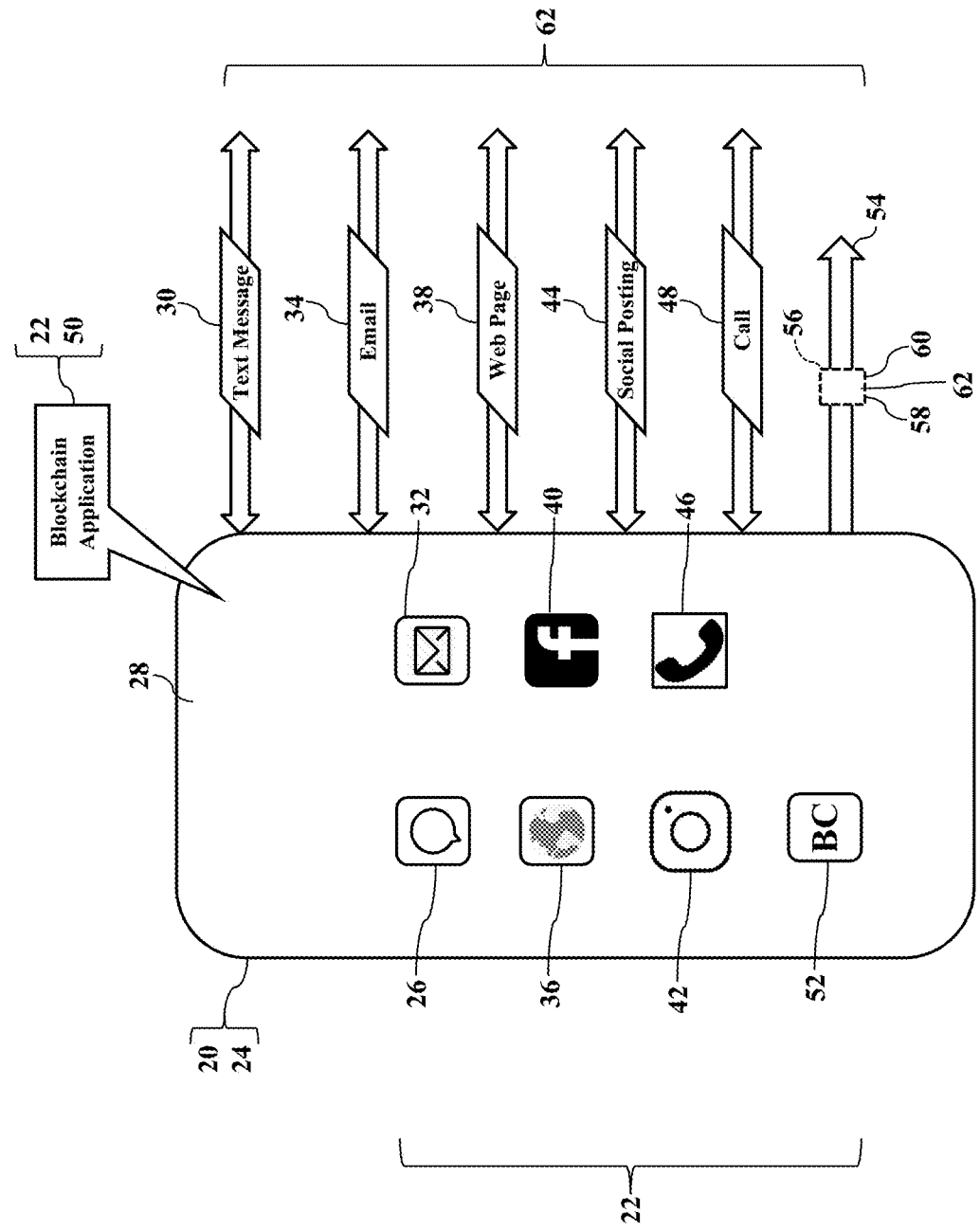

FIG. 2 documents this usage. However the smartphone 24 is used, exemplary embodiments provide immutable proof or evidence of usage. Another one of the software applications 22 is a blockchain application 50 (perhaps represented by the "BC" icon 52). As the smartphone 24 is used, the blockchain application 50 may record any usage in a personal blockchain 54. For example, the blockchain application 50 may cause the smartphone 24 to integrate any sent or received text message 30 as a block 56 of data within the personal blockchain 54. Similarly, any electronic mail 34 that is sent or received may be represented in one of the blocks 56 of data within the personal blockchain 54. Any web page 38, social posting 44, and call 48 may also be represented within the personal blockchain 54. Indeed, any usage of the smartphone 24, and/or any usage of any software application 22, may be documented within the personal blockchain 54. Moreover, exemplary embodiments may also integrate a date/time stamp 58 (e.g., date and time) and a current location 60 (e.g., GPS), thus further pinpointing any usage within the personal blockchain 54. The personal blockchain 54 thus acts or functions as a personal or private storage and evidentiary repository or archive for any usage of the smartphone 24.

Here, though, exemplary embodiments allow private record keeping. Even though any usage of the smartphone 24, and/or any software application 22, may be documented within the personal blockchain 54, any of the usage may be marked or designed as private 62. Any usage flagged as private 62 may thus not be shared, published, and/or disclosed, as later paragraphs will explain. So, even though the personal blockchain 54 may immutably record the date, time, and the location 60 of any usage, exemplary embodiments may be configured to not reveal any of the blocks 56 of data within the personal blockchain 54.

Figure 3:
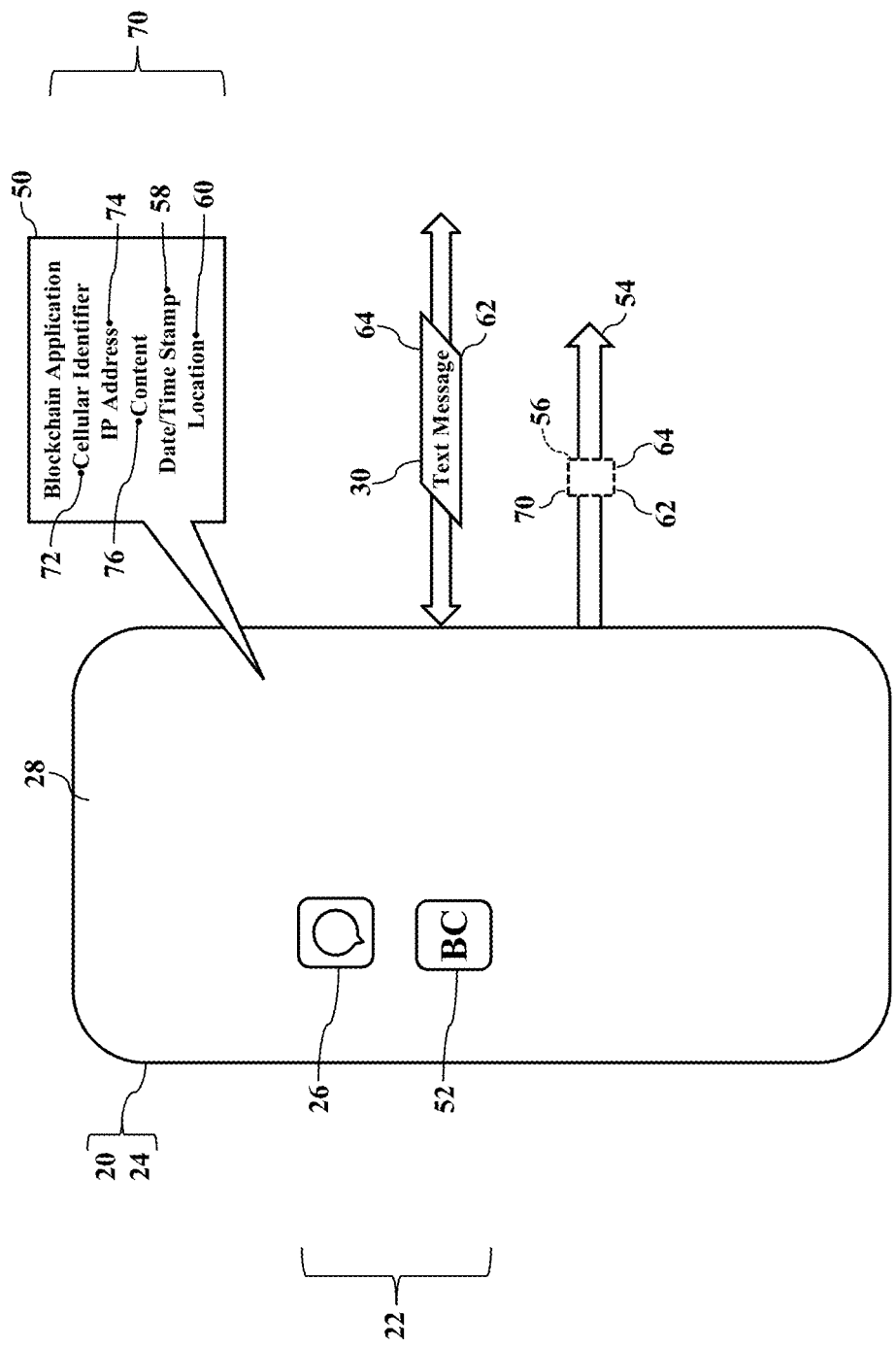

FIG. 3 illustrates a simple example. Many readers have used the smartphone 24 to send the electronic text message 30. When the user sends the text message 30, exemplary embodiments gather usage information 70. While the usage information 70 may be any electronic data or representation, the usage information 70 is likely binary data or values that particularly describe the text message 30. For example, the usage information 70 may include a sender's and/or a receiver's cellular identifier 72 and/or Internet protocol address 74. If the text message 30 has multiple recipients (such as a group distribution or TWITTER® account), then the usage information 70 may include any data representing multiple recipients. The usage information 70 may include data representing the content 76 of the text message 30, and the content 76 may include textual data, image data, video data, emoji content, and any other information. Moreover, the usage information 70 may also include the date/time stamp 58 and the location 60 (such as GPS information). The blockchain application 50 may independently collect the usage information 70, or the blockchain application 50 may interface with, and/or cooperate with, the messaging application (illustrated by the messaging icon 26) to gather the usage information 70. Regardless, the blockchain application 50 may then generate the personal blockchain 54 that incorporates or represents the usage information 70. The personal blockchain 54 thus contains the block 56 of data that immutably records the date, time, content 76, and the location 60 of the text message 30.

The text message 30 may also be private 62. When the user sends or receives the text message 30, the user may wish to keep the text message private 62. That is, even though exemplary embodiments may represent the usage information 70 in the block 56 of data within the personal blockchain 54, the user may wish that the block 56 of data not be revealed to others. The user, for example, may mark the text message 30 with a privacy parameter 64. The privacy parameter 64 is any selection, option, flag, data, or command that indicates the text message 30 is to be private 62. When the blockchain application 50 determines that the text message 30 has been configured as private 62, the blockchain application 50 may indicate that the block 56 of data is also private 62. So, even though the block 56 of data is integrated within the personal blockchain 54, exemplary embodiments may prevent the block 56 of data from being shared with, or sent to, other parties or services. The personal blockchain 54 thus immutably records the date, time, content 76, and the location 60 of the text message 30, but exemplary embodiments may prohibit that information from being publicly revealed.

Figure 4:
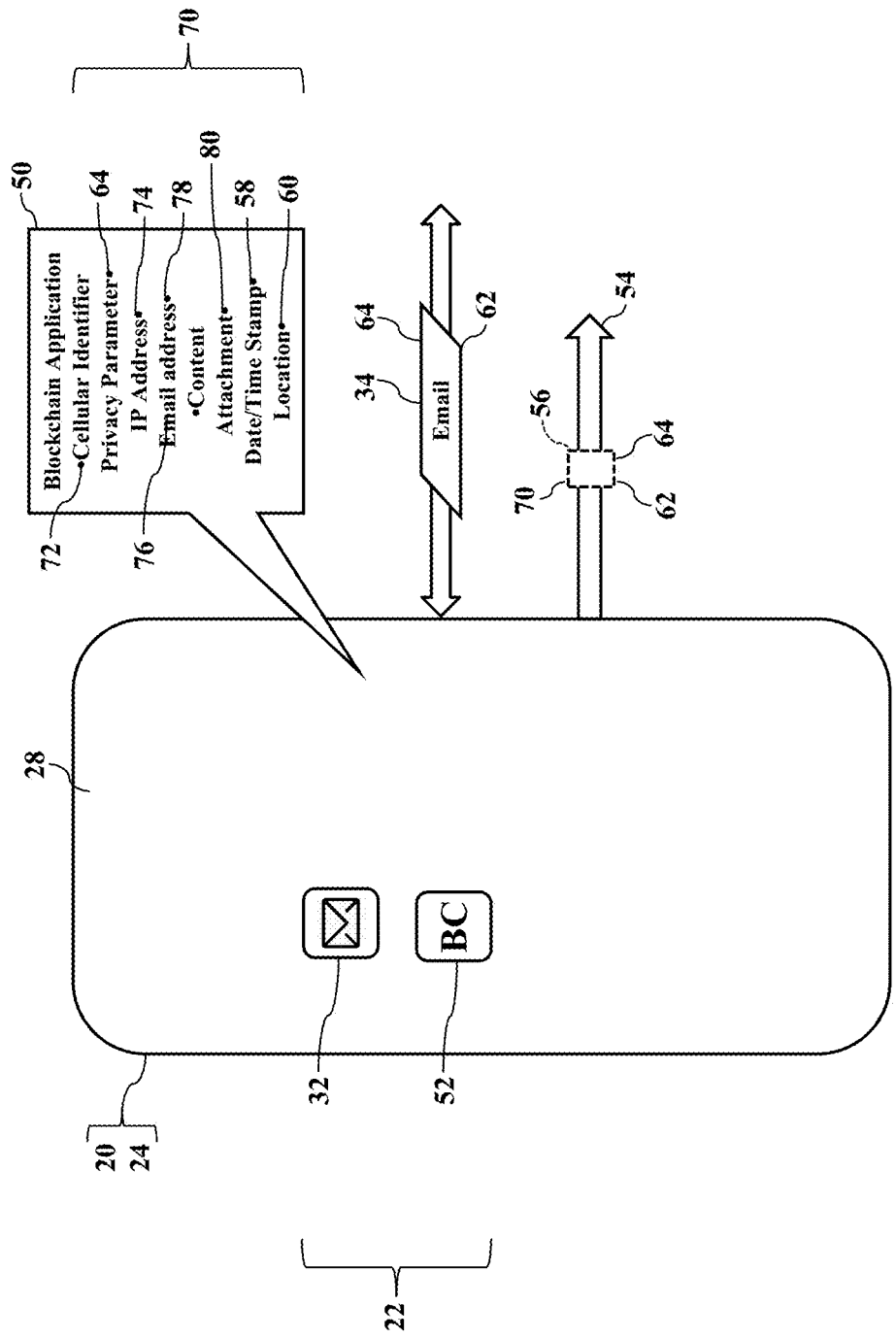
Figure 5:
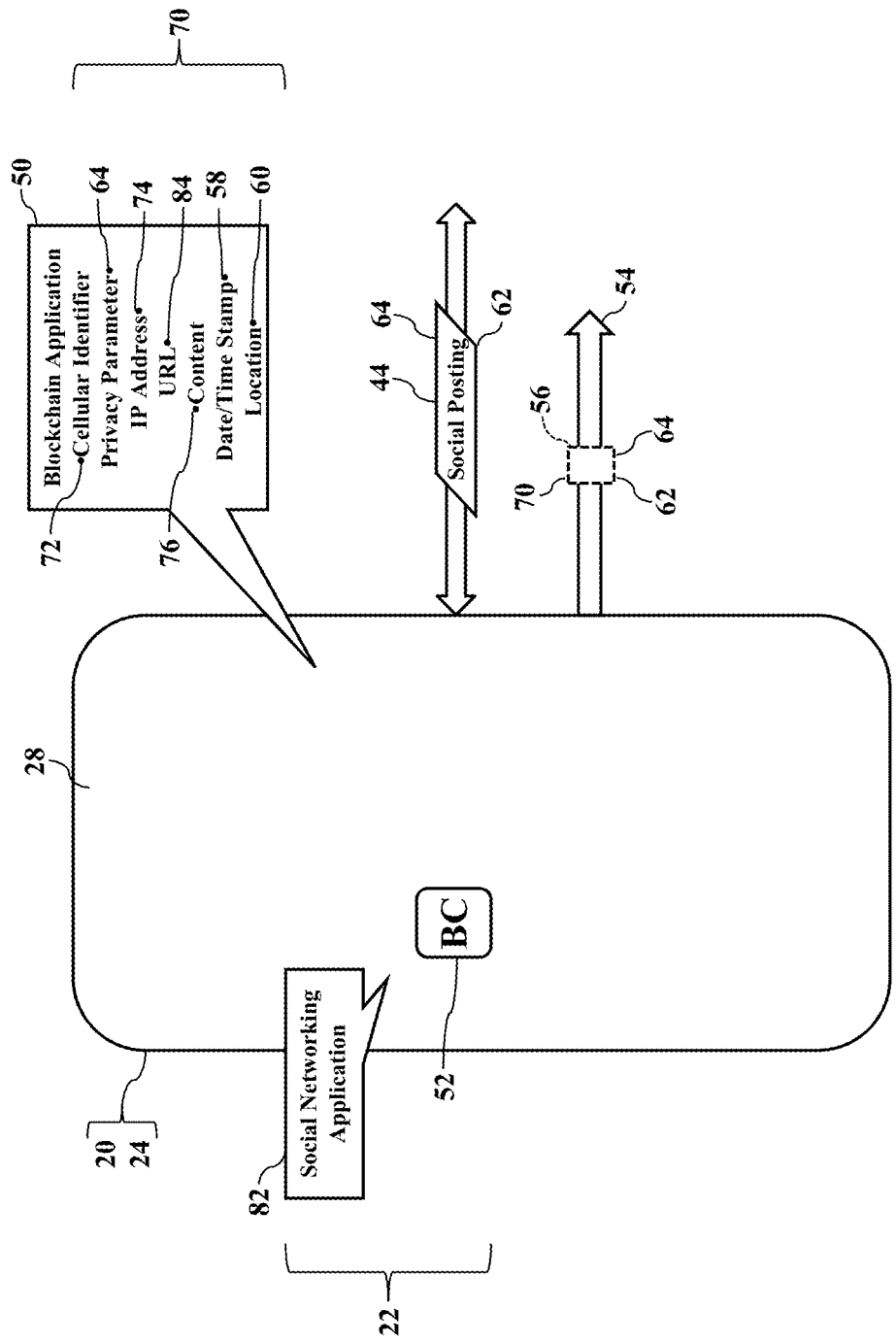

FIGS. 4-5 illustrate more examples. FIG. 4 illustrates documentation of the email message 34. When the user composes and sends the email message 34, or receives the email message 34, here again exemplary embodiments may permit the user to indicate the email message 34 is private 62 with the privacy parameter 64. The blockchain application 50 obtains the usage information 70 and receives the privacy parameter 64. The blockchain application 50 may generate the block 56 of data in the personal blockchain 54 that represents the email message 34. The usage information 70 may include the sender's and the receiver's cellular identifiers 72, IP addresses 74, and/or email addresses 78. The usage information 70 may also include the privacy parameter 64 and data representing the textual, video, and/or image content 76. The usage information 70 may also include data representing any email attachment 80 (such as a filename and/or byte count or file size). The usage information 70 may also include the date/time stamp 58 and GPS information representing the location 60. The blockchain application 50 may then send the block 56 of data and/or the personal blockchain 54 to any destination, as later paragraphs will explain.

FIG. 5 illustrates the social posting 44. Here the blockchain application 50 may preserve proof of the social posting 44 to FACEBOOK®, INSTAGRAM®, or other social networking site. The user invokes a social networking application 82 to compose and send/post her social posting 44 as an electronic message. The user may also indicate that the social posting 44 is private 62 (perhaps with the privacy parameter 64). Exemplary embodiments obtain the usage information 70 and the privacy parameter 64. Exemplary embodiments may then generate the block 56 of data in the personal blockchain 54. The usage information 70 may include the sender's cellular identifier 72 and/or the IP address 74 and a receiver's IP address or destination uniform resource locator ("URL") 84. The usage information 70 may include the privacy parameter 64 and data representing the textual, video, and/or image content 76, the date/time stamp 58, and GPS information representing the location 60. The blockchain application 50 may then send the block 56 of data and/or the personal blockchain 54 to any destination, as later paragraphs will explain.

Figure 6:
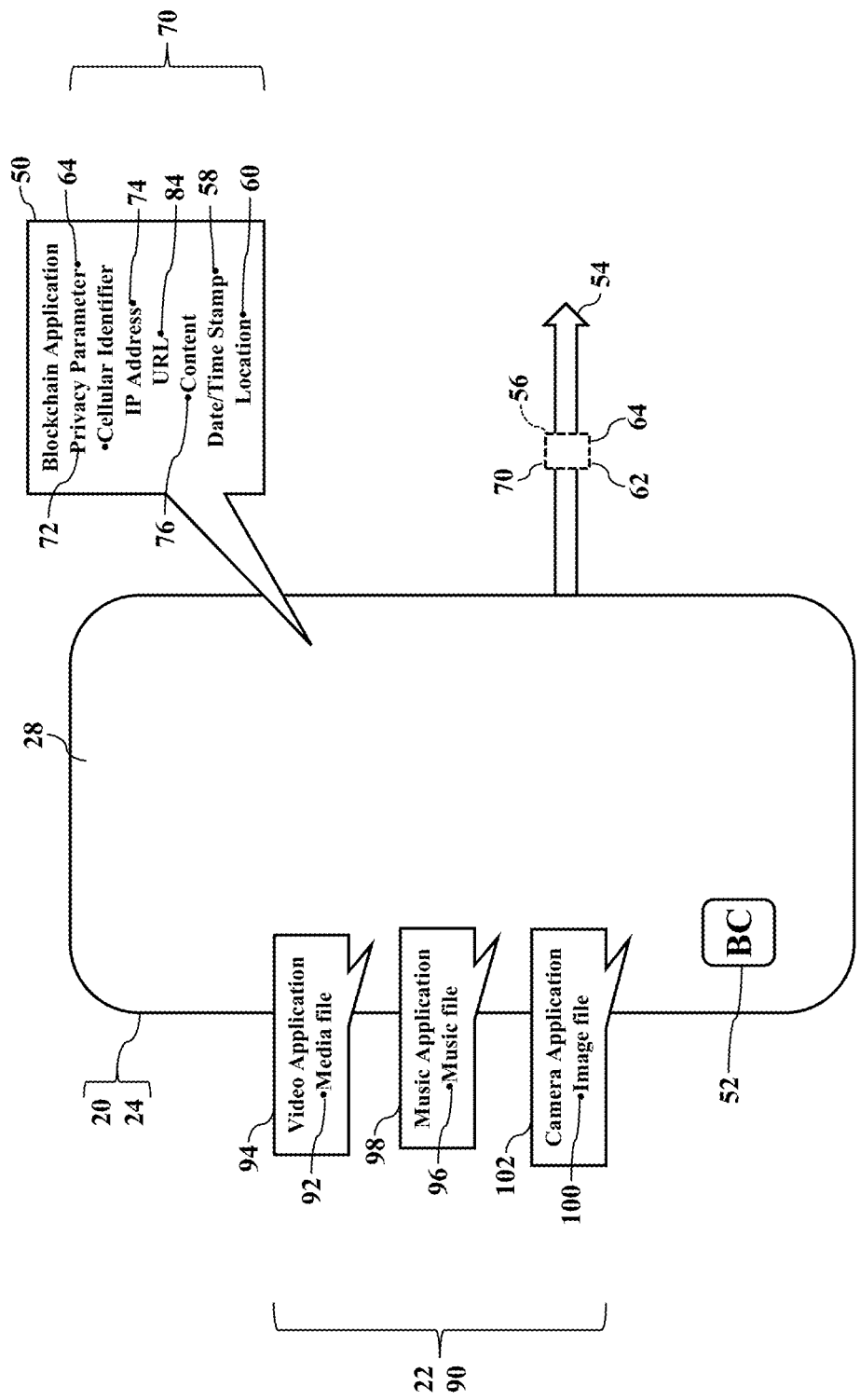

FIG. 6 illustrates other digital assets. Here the user's personal blockchain 54 may privately document any electronic or digital content 90 stored by, or accessed by, the smartphone 24. Again, as the reader likely understands, the smartphone 24 may stream, download, store, and/or play a digital movie or media 92 (perhaps by executing a video application 94) and a digital music 96 (perhaps by executing a music application 98). The smartphone 24 may also capture and store a digital image 100 using a camera application 102 (and a digital camera, not shown for simplicity). Whatever the digital asset 90, the blockchain application 50 may retrieve its corresponding usage information 70 (e.g., cellular identifier 72, IP address 74, the date/time stamp 58, the URL 84, the location 60, the privacy parameter 64, and data representing a title, description, and/or the content 76). Exemplary embodiments may then generate the block 56 of data in the personal blockchain 54. When the smartphone 24 requests, downloads, and/or receives the digital asset 90, exemplary embodiments may document that usage in the personal blockchain 54. Each time the smartphone 24 retrieves and/or plays back the digital asset 90, exemplary embodiments may retrieve the corresponding usage information 70 (e.g., the date/time stamp 58 of playback, the location 60, the privacy parameter 64, and textual description) and generate another block 56 of data in the personal blockchain 54. Moreover, should the smartphone 24 pause playback, the blockchain application 50 may retrieve the corresponding usage information 70 (e.g., the date/time stamp 58, location 60 of pausing and perhaps the privacy parameter 64) and generate another block 56 of data in the personal blockchain 54. When the smartphone 24 later resumes play, the blockchain application 50 may retrieve the corresponding usage information 70 (e.g., the date/time stamp 58 and location 60 of resumption and, if desired, the privacy parameter 64) and generate another block 56 of data in the personal blockchain 54. The user's personal blockchain 54 may thus privately document each complete or partial consumption of the digital asset 90.

Figure 7:
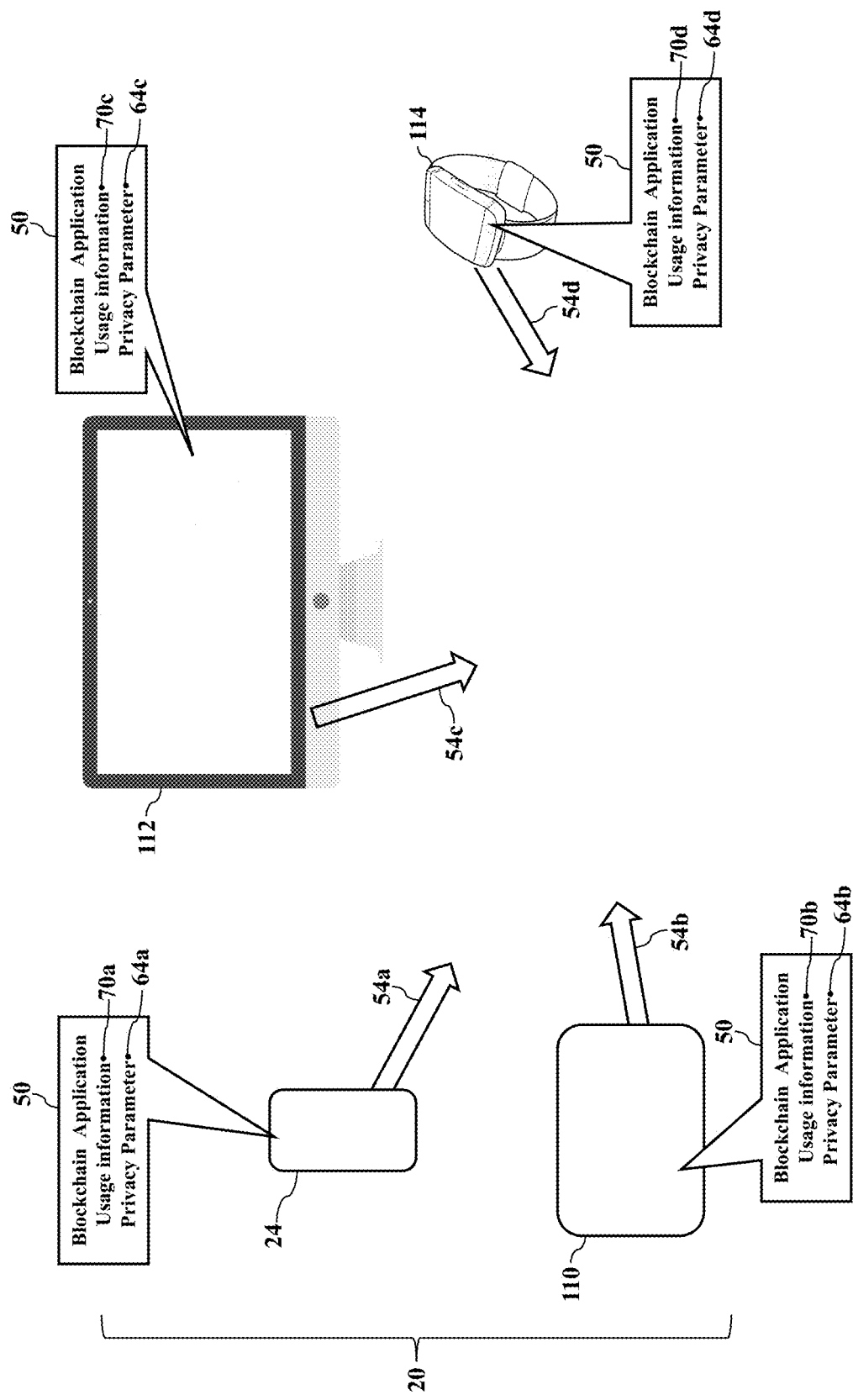

FIG. 7 illustrates device-specific implementations. As the reader likely understands, the user may have multiple devices 20. That is, suppose the user has the smartphone 24, a tablet computer 110 (such as an APPLE IPAD®), perhaps a desktop computer 112, and perhaps even a smartwatch 114. Whatever the device 20, exemplary embodiments may document any usage of either one of the multiple devices 20. Each one of the devices 20 may individually download, locally store, and execute the blockchain application 50. Each one of the devices 20, in other words, may locally generate a device-specific, personal blockchain 54a-d that documents the usage of the corresponding device 20. For example, the blockchain application 50 (locally operating in the smartphone 24) collects its corresponding usage information 70a and generates the personal blockchain 54a representing the usage of the smartphone 24. The user may individually mark any usage with the privacy parameter 64a, thus preventing the personal blockchain 54a from publicly revealing specific usage.

The user's other devices 20 may generate their own, individual blockchains. For example, any time the tablet computer 110 is used, its locally-stored blockchain application 50 collects the corresponding usage information 70b and generates the personal blockchain 54b that is dedicated to or represents the tablet computer 110. The personal blockchain 54b thus immutably documents any usage information 70b received by, generated by, and/or transmitted by the tablet computer 110. Similarly, whenever the desktop computer 112 and the smartwatch 114 operate, the locally-stored blockchain applications 50c-d collects the corresponding usage information 70c-d and generates entries in the personal blockchains 54c-d that is specific, respectively, to the desktop computer 112 and to the smartwatch 114. The personal blockchains 54c-d thus immutably document any device-specific usage information 70c-d received by, generated by, and/or transmitted by the desktop computer 112 and the smartwatch 114. Exemplary embodiments permit the user to mark any usage information 70a-d with the privacy parameter 64a-d, thus preventing the corresponding personal blockchain 54a-d from publicly revealing specific usage.

Figure 8:
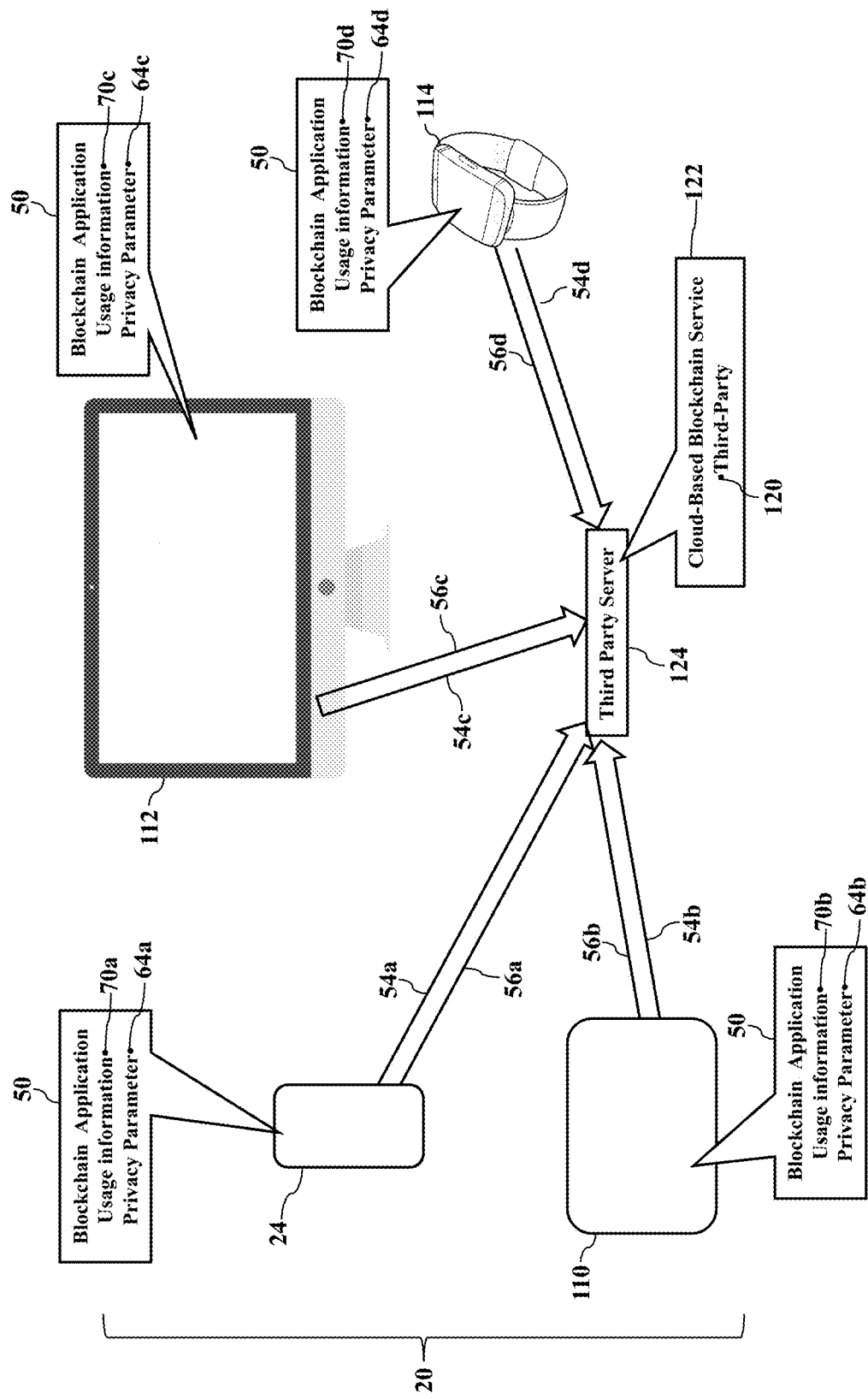

FIG. 8 illustrates centralized collection. Here the user's multiple devices 20 may export their respective device-specific, personal blockchains 54a-d to a common network destination. Because each of the user's devices 20 may generate its own, personal blockchain 54a-d, the common user may wish to utilize a third-party 120 to manage all her personal blockchains 54a-d. The third-party 120, for example, offers an online, cloud-based blockchain service 122 that offers the blockchain application 50 for download to customers/subscribers as a service provider. Each one of the user's multiple devices 20 may thus send their respective device-specific, personal blockchains 54a-d to a network address (e.g., IP address) associated with the third-party 120 (such as a third-party server 124). When the third-party server 124 receives any blocks 56a-d of data associated with any of the device-specific, personal blockchains 54a-d, the third-party server 124 may then provide the cloud-based blockchain service 122. The cloud-based blockchain service 122, for example, may publicly document any of the device-specific, personal blockchains 54a-d. However, if any block 56a-d of data includes, references, or is associated with the privacy parameter 64a-d, then the cloud-based blockchain service 122 may decline to or refrain from publicly publishing that block 56a-d of data. So, even though the user's devices 20 may generate multiple, personal blockchains 54a-d, the cloud-based blockchain service 122 may publicly publish some blocks 56 of data for inspection and verification (which later paragraphs will explain). The cloud-based blockchain service 122, in other words, functions or acts as a public ledger that establishes chains of blocks of immutable evidence. However, any blocks 56 of data referencing the privacy parameter 64 may not be publicly published to ensure privacy or confidentiality.

Figure 9:
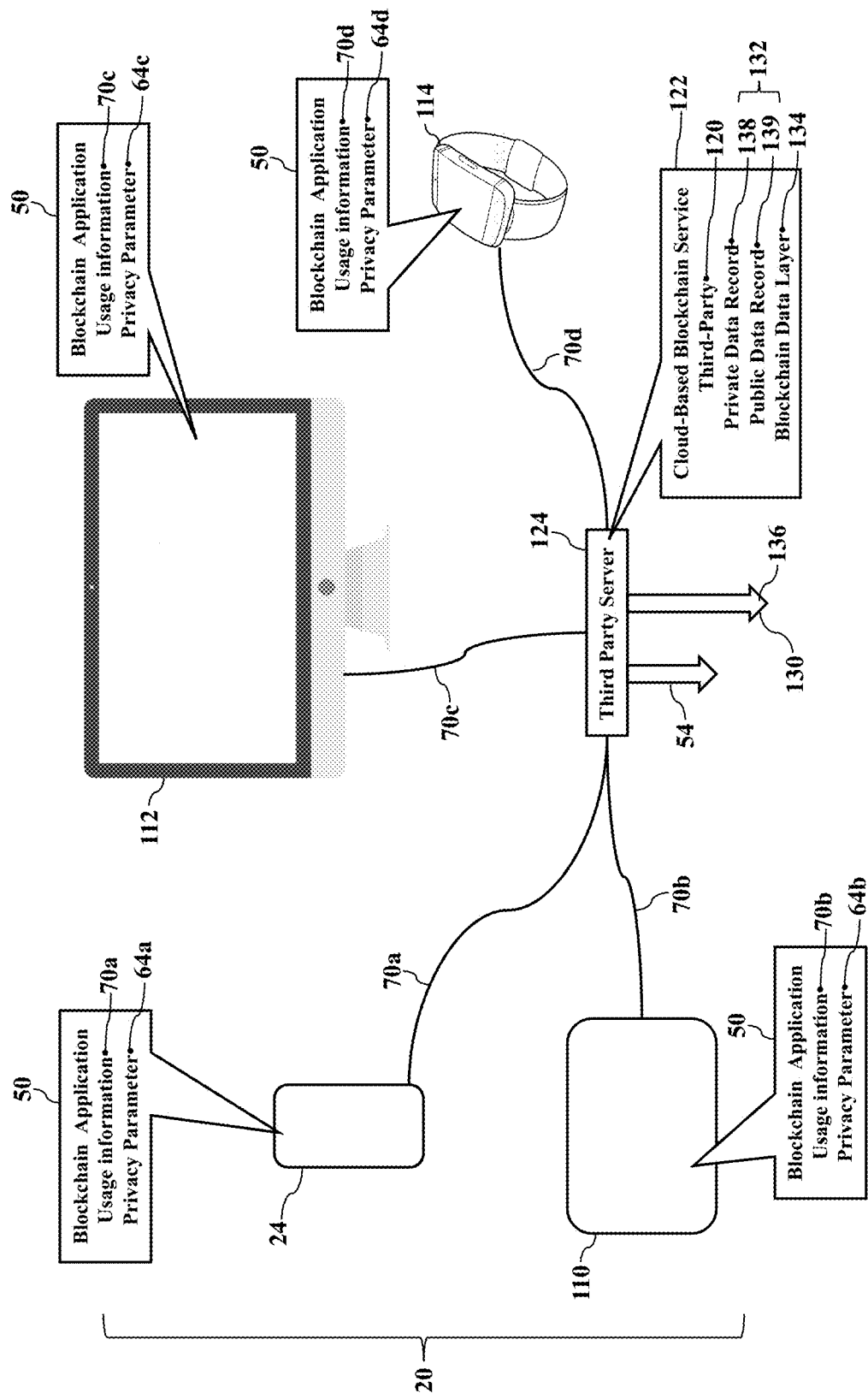

FIG. 9 also illustrates centralized collection. Here, though, exemplary embodiments may send or push the usage information 70a-d to the cloud-based blockchain service 122. When any blockchain application 50, executed by any of the user's devices 20, obtains the usage information 70 and the privacy parameter 64, here exemplary embodiments may send the usage information 70 and/or the privacy parameter 64 directly to the third-party server 124. The cloud-based blockchain service 122 may then generate the personal blockchain 54. The personal blockchain 54, in other words, is specific to the user and is dedicated to documenting usage of all the user's multiple devices 20. The cloud-based blockchain service 122 thus collects any or all of the usage information 70a-d generated by any of the user's devices 20, perhaps including any usage information 70a-d having the privacy parameter 64a-d. The usage information 70a-d may then be incorporated as data records in the user-specific personal blockchain 54. The user-specific personal blockchain 54 may be private and not available for public inspection, perhaps depending on a presence of the privacy parameter 64.

As FIG. 9 also illustrates, the cloud-based blockchain service 122 may have a public option. When the third-party server 124 receives the usage information 70a-d, some of the usage information 70a-d may be permissible for public documentation. That is, the usage information 70 lacking a reference to the privacy parameter 64 may be publicly published via a public blockchain 130. The third-party server 124, for example, may generate data records 132 in a blockchain data layer 134, as later paragraphs will explain. Moreover, the third-party server 124 may also add an additional layer of cryptographic hashing to generate one or more cryptographic proofs 136. The cryptographic proofs 136 may then be incorporated into the public blockchain 130. The cloud-based blockchain service 122 may then publicly publish or distribute the public blockchain 130 (such as via the Internet). The public blockchain 130 thus serves or acts as a validation of the cloud-based blockchain service 122 (perhaps described by the data records 132 within the blockchain data layer 134). The public blockchain 130 thus publishes the cryptographic proofs 136 to confirm that the usage information 70*a-d* was converted into, or integrated into, the user-specific personal blockchain 54 and/or into the public blockchain 130. The cryptographic proof 136, in other words, acts as a data anchor in the public blockchain 130 to document the date and time that the cloud-based blockchain service 122 was executed. The public blockchain 130 thus acts as a public ledger that establishes chains of blocks of immutable evidence. Each cryptographic proof 136 thus provides evidentiary documentation of the cloud-based blockchain service 122.

Some of the usage information 70, though, may be private 62. That is, if any of the usage information 70 includes or indicates the privacy parameter 64, then the cloud-based blockchain service 122 may decline or fail to publicly publish or distribute via the public blockchain 130. The third-party server 124 may still generate the data records 132 in the blockchain data layer 134, and the third-party server 124 may also add the additional layer of cryptographic hashing to generate the cryptographic proofs 136. The cryptographic proofs 136 may be incorporated into the personal blockchain 54, as the privacy parameter 64 may permit. However, the cryptographic proofs 136 may not be incorporated into the public blockchain 130, in response to the privacy parameter 64.

The blockchain data layer 134 may thus have public and private portions. As the third-party server 124 generates the data records 132 in the blockchain data layer 134, some of the data records 134 may be private data records 138 and some of the data records 134 may be public data records 139. The private data records 138 may be generated based on the usage information 70 indicating or including the privacy parameter 64. The public data records 139 may be generated based on the usage information 70 lacking an association with, or indication of, the privacy parameter 64. The private data records 138 and the public data records 139 may both be incorporated into the personal blockchain 54. The private data records 138, though, may be impermissible for integration into the public blockchain 130. The private data records 138 may even be tagged with or include metadata indicating the privacy parameter 64 to help prevent public disclosure. Moreover, exemplary embodiments may even segregate or differentiate the private data records 138 from the public data records 139 to further ensure no public disclosure.

Figure 10:
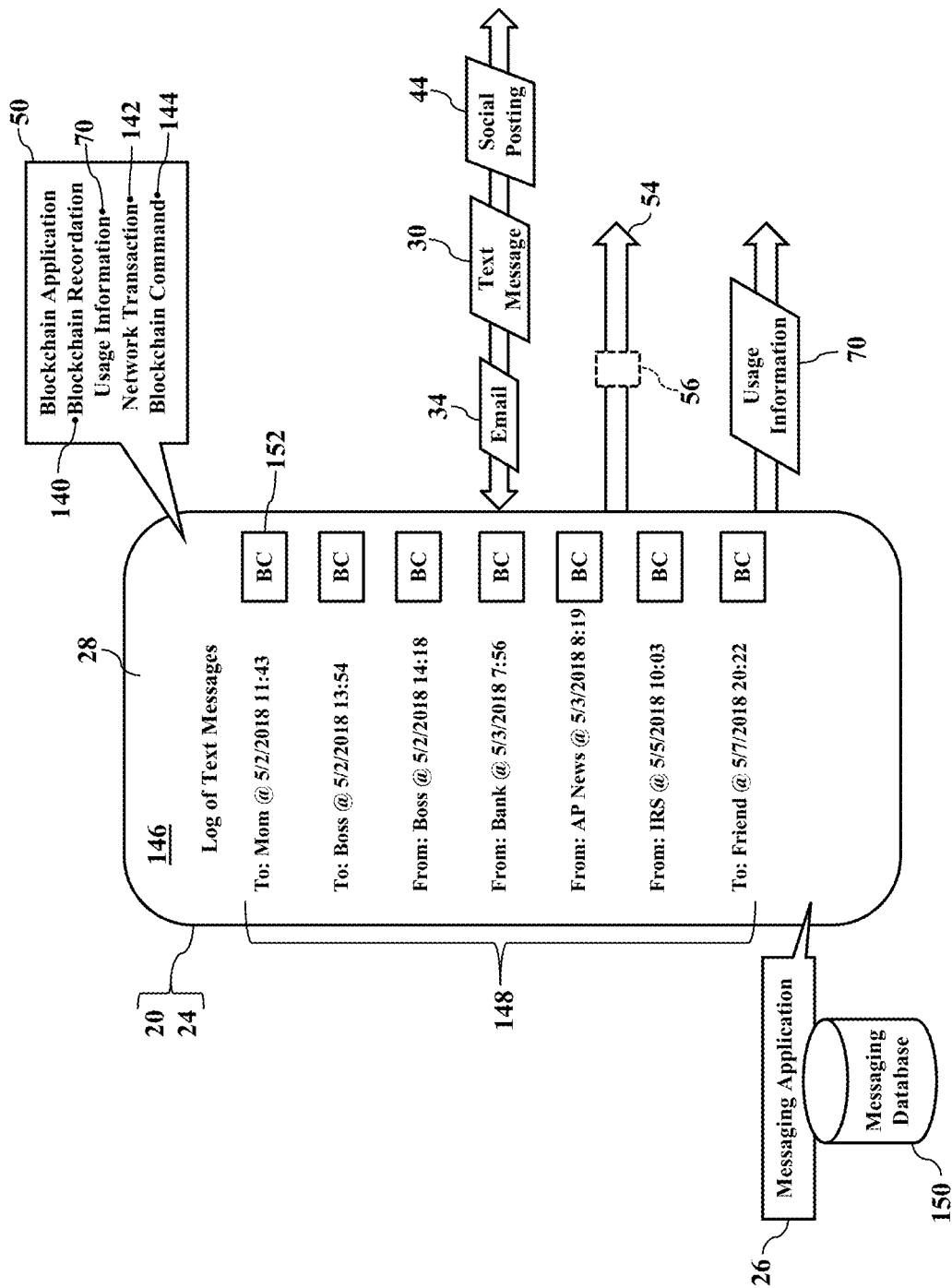

FIG. 10 illustrates transactional mechanisms. The above paragraphs explain how any usage of the devices 20 may be immutably evidence using blockchain technology. As the reader may understand, though, not all usage is worthy of blockchain documentation. For example, some emails 34, text messages 30, and social postings 44 represent trivial matters that have little financial value or importance (especially if the cloud-based blockchain service 122 imposes financial charges and/or storage limits). The user, then, may wish to conserve resources (e.g., time and/or money) and only blockchain important messages, topics, or usage.

FIG. 10 thus illustrates a blockchain recordation 140. When the user wishes to document any usage information 70 and/or any network transaction 142 (such as a send/receipt of the SMS text message 30, email 34, web page 38, and social posting 44), the user issues, enters, or inputs a blockchain command 144. While exemplary embodiments may utilize any mechanism for providing or generating the blockchain command 144, most readers are familiar with graphical representation. The blockchain application 50, for example, may cause the smartphone 24 to generate a graphical user interface 146 that displays a list 148 of the text messages 30. Exemplary embodiments may interface with, or cooperate with, the messaging application 26 to query a messaging database 150. The messaging database 150 is a local or remote resource that stores or logs historical text messages 30 associated with the smartphone 24. Exemplary embodiments may thus retrieve any usage information 70 describing any text message 30 sent from, or received by, the smartphone 24. Exemplary embodiments may then display or present the blockchain command 144 as a graphical icon 152 for selection via the touch-screen display device 28. The blockchain command 144 may thus be a graphical control that is generated and displayed for invoking the blockchain recordation 140 of an individual one or more of the text messages 30. When the user wishes to blockchain any text message 30 in the list 148, the user need only input the corresponding blockchain command 144 (such as touching the capacitive pixels associated with the graphical icon 152). The blockchain application 50 may then collect the usage information 70 associated with the text message 30 selected for the blockchain recordation 140 (perhaps as stored in the messaging database 150). The blockchain application 50 may then blockchain the selected text message(s) 30, as above explained.

Figure 11:
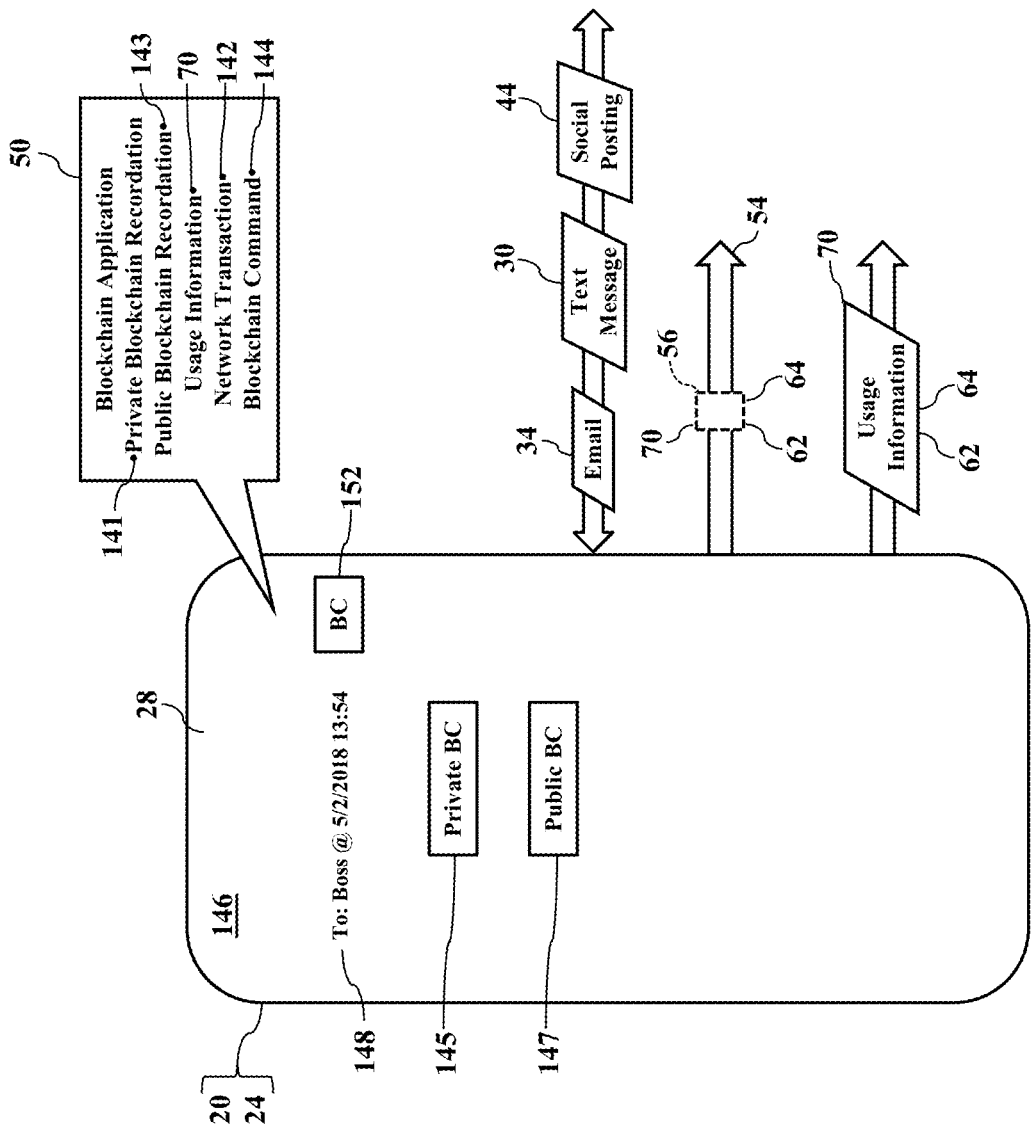

FIG. 11 illustrates a private blockchain recordation 141. When the user selects the blockchain command 144 (such as the "BC" graphical icon 152), exemplary embodiments may also prompt for the private blockchain recordation 141 or for a public blockchain recordation 143. The private blockchain recordation 141 maintains the privacy and confidentiality of the usage information 70 and may record the usage information 70 in the personal blockchain 54. The public blockchain recordation 143, though, would authorize public disclosure of the usage information 70. In plain words, would the user like the text message 30, the email message 34, the social posting 44, or any other usage publicly revealed or privately recorded? While exemplary embodiments may utilize any mechanism for selection, FIG. 11 illustrates touch commands or inputs. That is, the blockchain application 50 may cause the smartphone 24 to generate a private "BC" icon 145 and/or a public "BC" icon 147 via the graphical user interface 146. When the user selects the private "BC" icon 145, exemplary embodiments may configure the usage information 70 for the private blockchain recordation 141 (such as including or specifying the privacy parameter 64). The private blockchain recordation 141 thus restricts the usage information 70 to only recordation in the personal blockchain 54. However, if the user selects the public "BC" icon 147, exemplary embodiments may configure the usage information 70 for the public blockchain recordation 143, thus perhaps permitting additional recordation to the public blockchain 130 (as explained with reference to FIG. 9).

Figure 12:
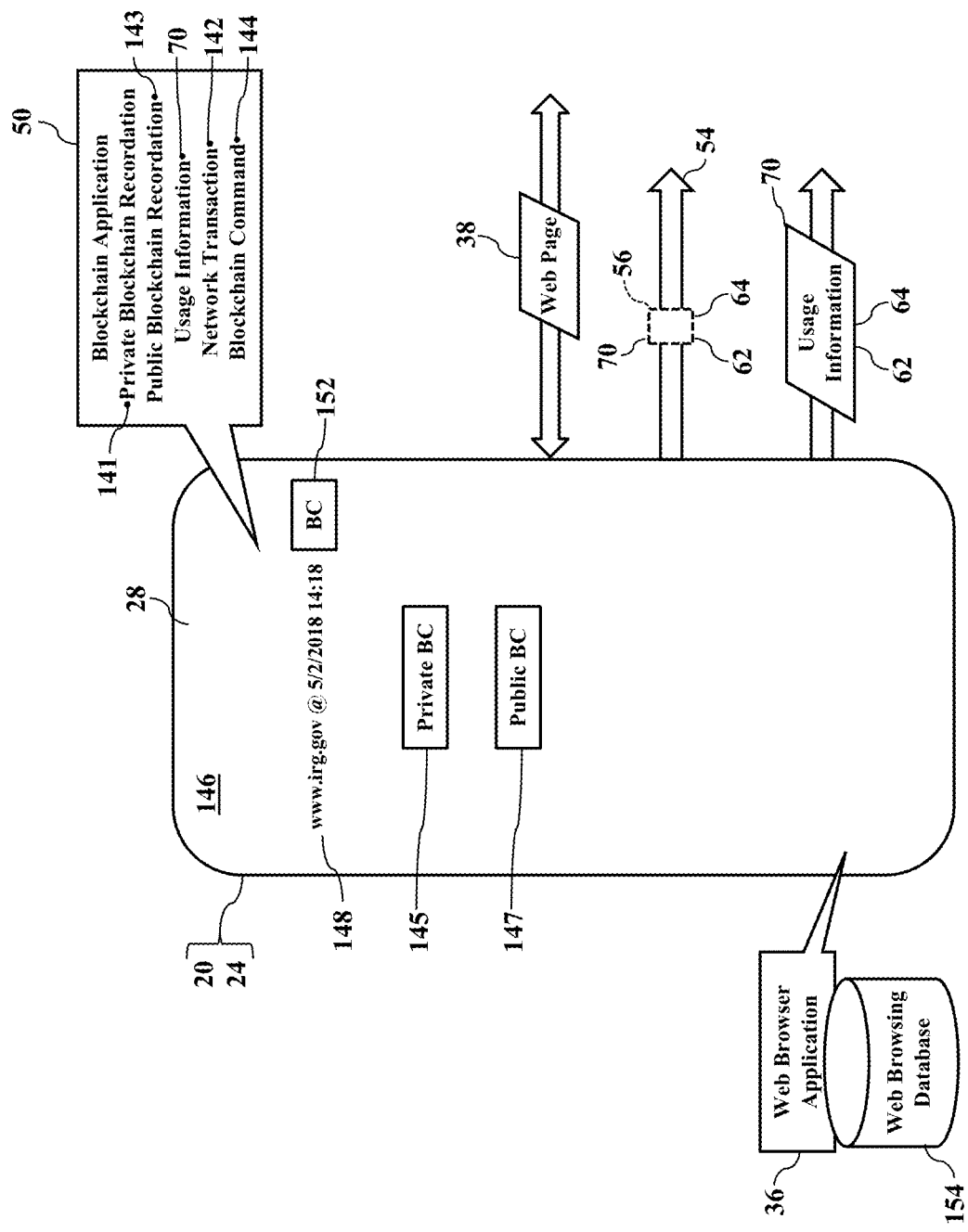
Figure 13:
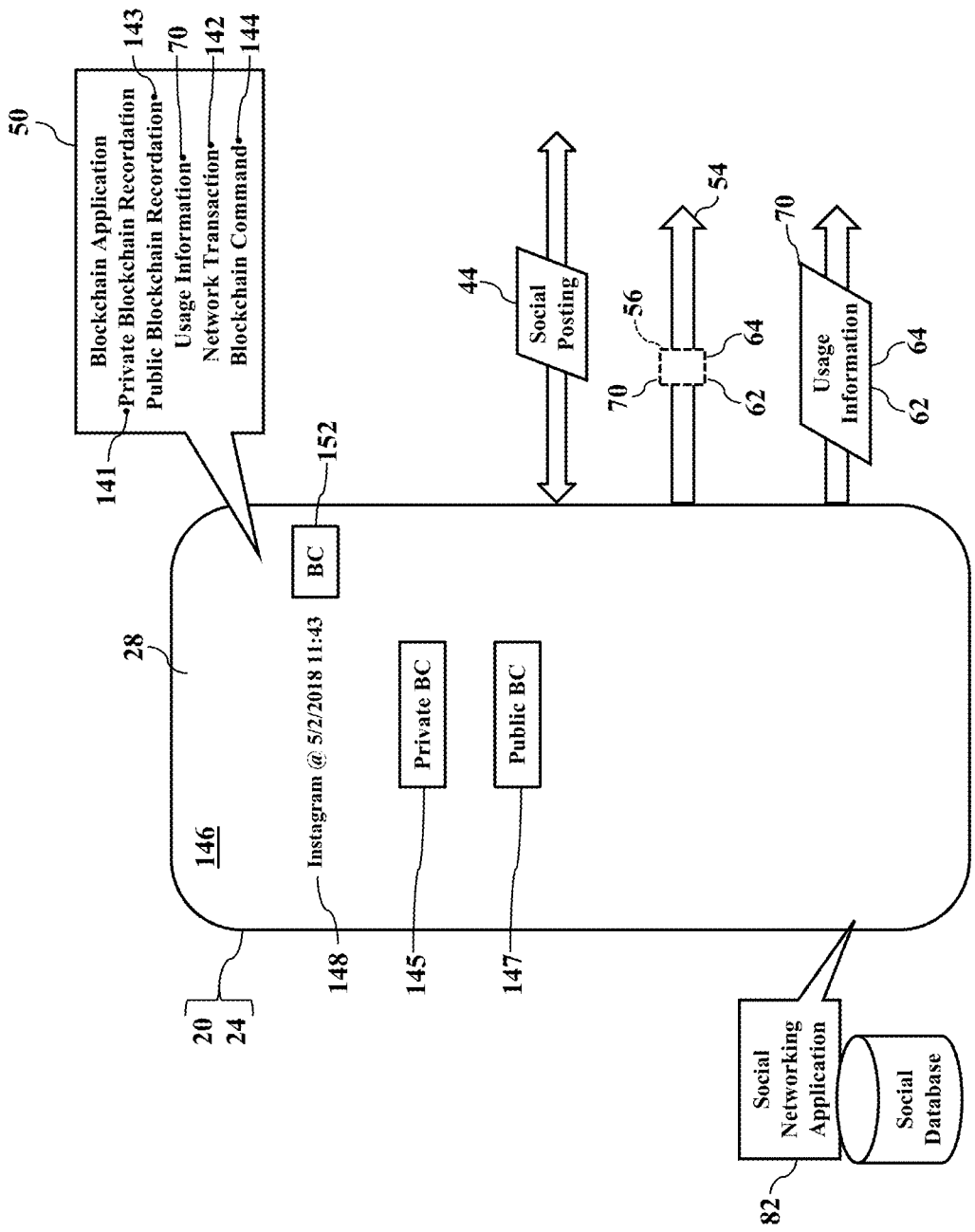
Figure 14:
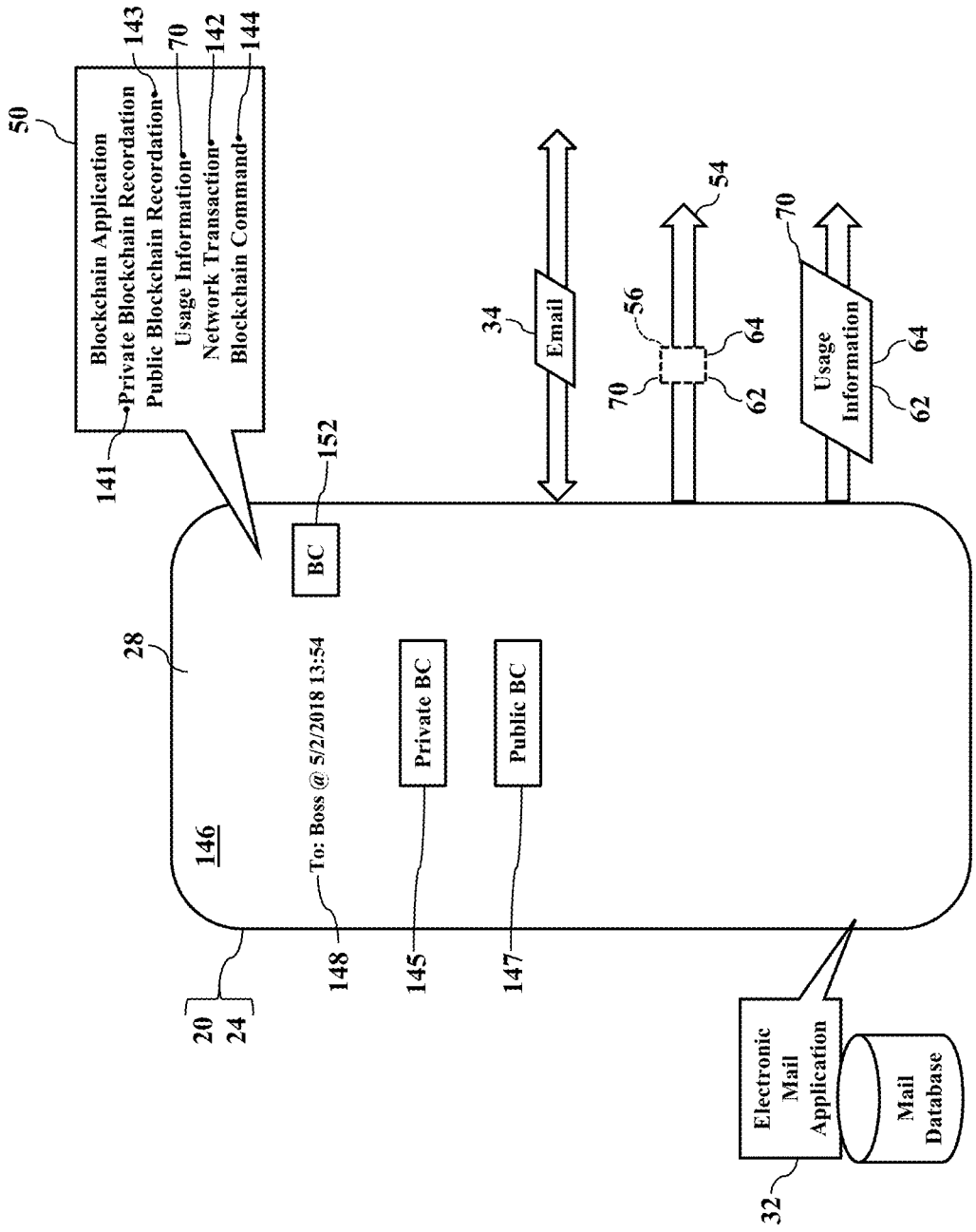
Figure 15:
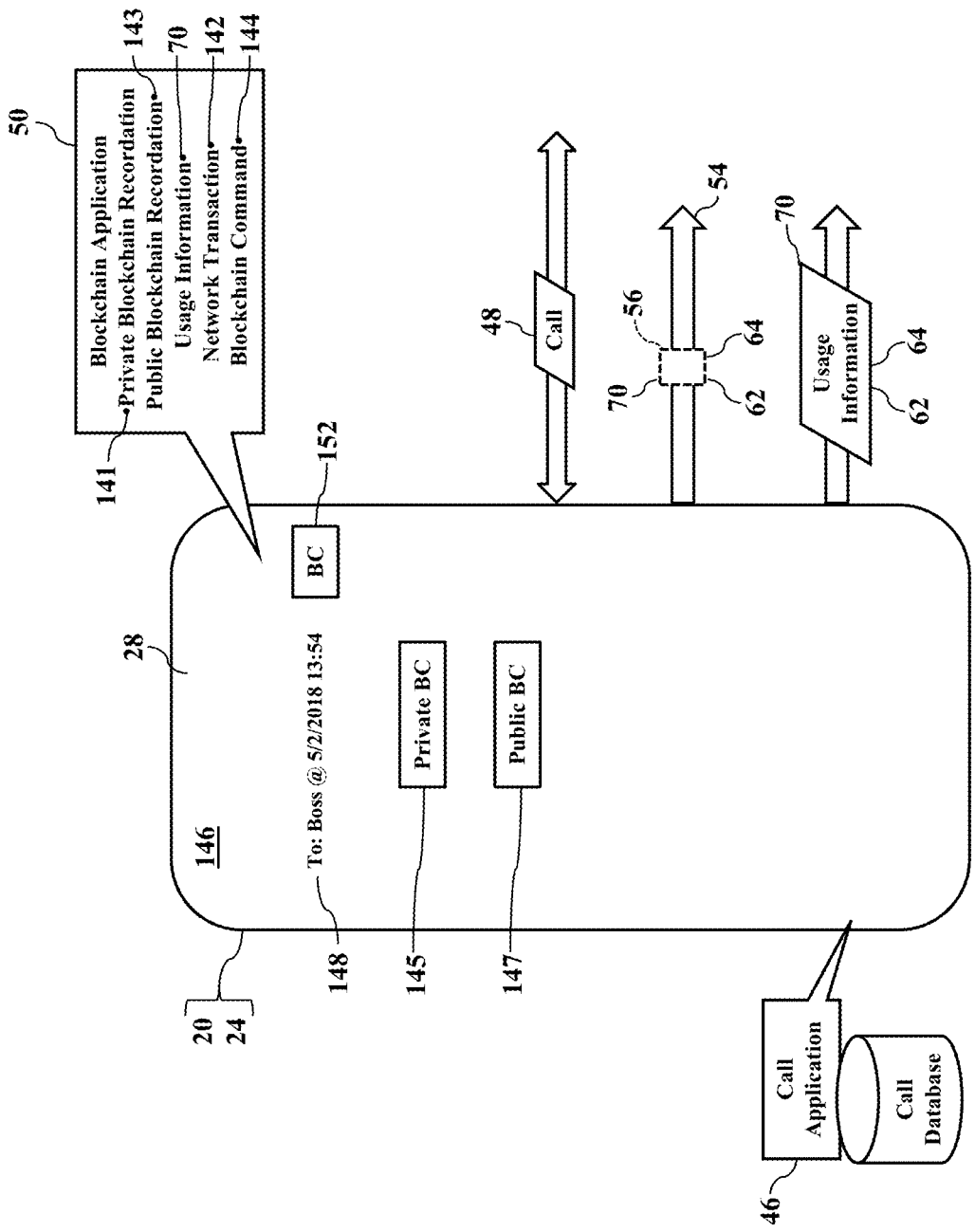

FIGS. 12-15 illustrate other public and private blockchain recordations. FIG. 12, for example, illustrates the private blockchain recordation 141 or the public blockchain recordation 143 of any historical browsing behavior. The blockchain application 50 may interface with the web browser application 36 to query a web browsing database 154 that locally or remotely stores historical requests for the web pages 38 associated with the smartphone 24. The graphical user interface 146 may then be tailored to present historical web pages 38 requested or downloaded. If the user selects the private "BC" icon 145, then exemplary embodiment may configure the usage information 70 to maintain a privacy of the web page 38 in the user's personal blockchain 54. However, should the user select the public "BC" icon 147, then exemplary embodiments may configure the usage information 70 for the public blockchain recordation 143 (again, perhaps via the public blockchain 130 (as explained with reference to FIG. 9). FIGS. 13-15 illustrate similar mechanisms for the historical social postings 44, the historical emails 34, and the historical calls 48. Exemplary embodiments thus allow the user to access historical usage, to privately blockchain any logged usage, and to mark current or historical usage for the public blockchain recordation 143. The user, in other words, may go backwards in time, inspect usage logs, and ex post facto add historical usage to her personal blockchain 54 and/or to the public blockchain 130. So, the user need not immediately guess or estimate what usage is worthy of blockchaining. The user, instead, may wait and see which historical text messages 30, emails 34, web pages 38, social postings 44, and other usage becomes important for blockchaining.

Figure 16:
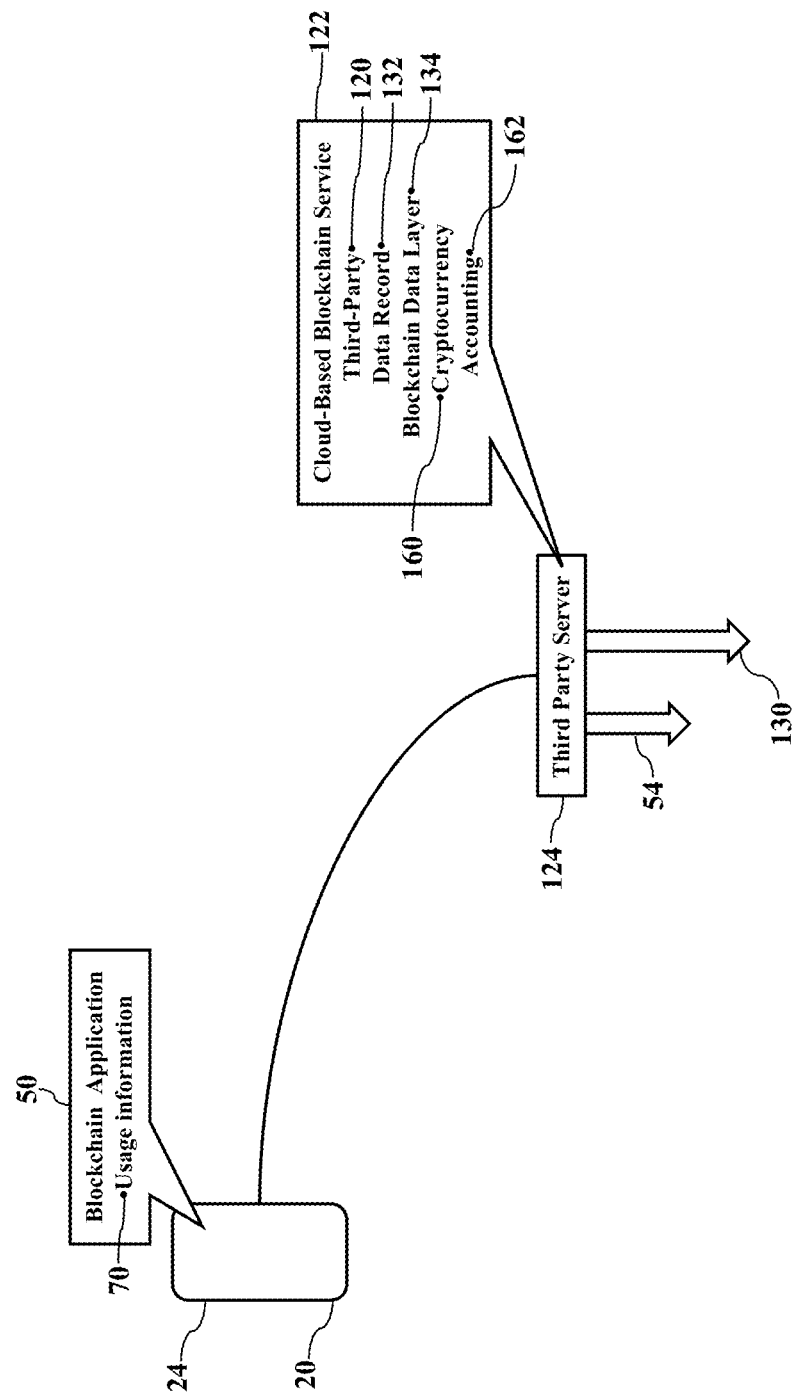

FIG. 16 illustrates a compensation scheme. When the third-party server 124 provides the cloud-based blockchain service 122, the third-party 120 may be compensated for the blockchain application 50, for generating the personal blockchain 54, for generating the data record(s) 132 in the blockchain data layer 134, and/or for generating entries in the public blockchain 130. That is, the third-party server 124 provides or executes the cloud-based blockchain service 122 in exchange for some kind of compensation. While the compensation may be a conventional currency, FIG. 16 illustrates a cryptocurrency 160. That is, the smartphone 24 and the third-party server 124 may exchange electronic tokens, coins, or other forms of the cryptocurrency 160. The cryptocurrency 160 may then be recorded as yet another transaction or block of data within the personal blockchain 54 and/or the public blockchain 130. The smartphone 24 and the third-party server 124 may thus generate an accounting 162 in response to the cloud-based blockchain service 122. Moreover, either or both of the personal blockchain 54 and/or the public blockchain 130 may also document the accounting 162.

Exemplary embodiments thus present an elegant solution. Exemplary embodiments may generate the personal blockchain 54 that documents personal usage of a single device (such as the smartphone 24). However, when the multiple devices 20 are associated with the same user (perhaps by a common user identifier, account, or authentication scheme), exemplary embodiments may additionally or alternatively create the user-specific, personal blockchain 54 that documents personal usage of all her multiple devices 20. Because some usage may be unworthy or not meaningful for blockchain documentation, exemplary embodiments may also permit selection of individual, historical usage that deserves the blockchain recordation 140. Because blockchain technology integrates or chains cryptographically hashed blocks of data, timestamps, and other data, the personal blockchain 54 may thus be a distributed ledger that privately records transactional usage. Moreover, any of the usage may be designated or authorized for public disclosure. The user, in other words, may choose which usage may be cryptographically published as a public witness via anchor(s) to the public blockchain 130.

FIGS. 17-21 are more detailed illustrations of an operating environment, according to exemplary embodiments. FIG. 16 illustrates the user's device 20 communicating with the third-party server 124 via a communications network 170. The user's device 20 has a processor 172 (e.g., "μP"), application specific integrated circuit (ASIC), or other component that executes the blockchain application 50 stored in a local, solid-state memory device 174. The user's device 20 has a network interface 176 to the communications network 170, thus allowing two-way, bidirectional communication (perhaps with the third-party server 124). The blockchain application 50 includes instructions, code, and/or programs that cause the device 20 to perform operations, such as collecting the usage information 70.

Figure 17:
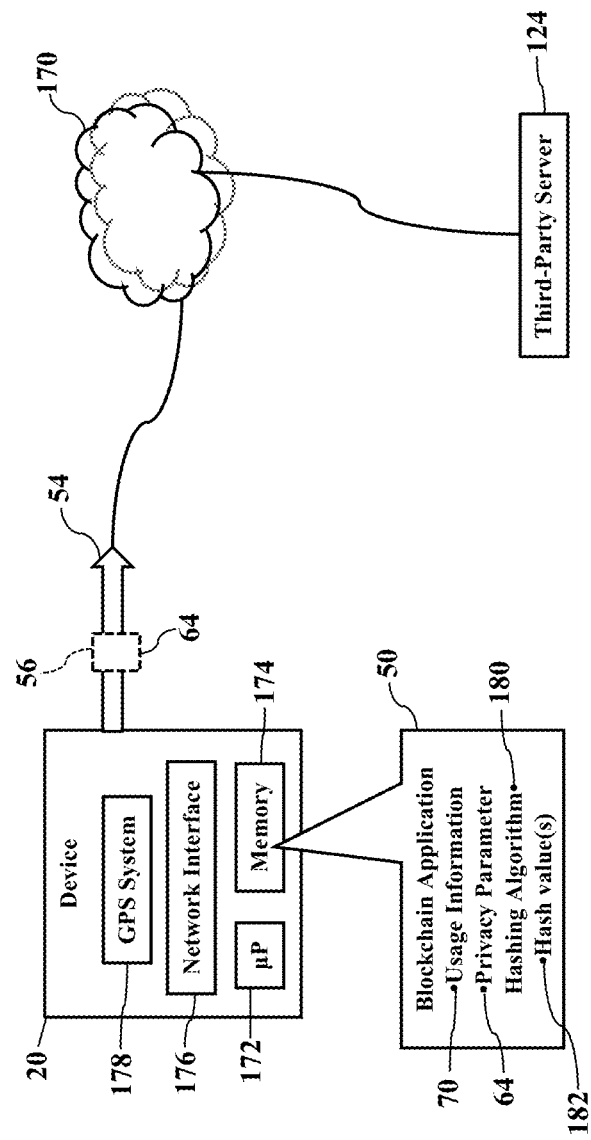
FIGS. 17-21 are more detailed illustrations of an operating environment, according to exemplary embodiments.

FIG. 17 also illustrates the personal blockchain 54. When the user's device 20 executes the blockchain application 50, the blockchain application 50 may cause the user's device 20 to generate data records in the personal blockchain 54. The blockchain application 50 collects the usage information 70, perhaps including the date/time stamp 58, the location 60 (explained above with reference to FIGS. 3-6), and/or the privacy parameter 64. The location 60 may be global positioning system ("GPS") information generated by an internal GPS receiver, card, or other system 178. Indeed, the GPS system 178 may also derive or generate the date/time stamp 58. Regardless, the blockchain application 50 may then call, invoke, and/or apply an electronic representation of a hashing algorithm 180 to any of the usage information 70. The hashing algorithm 180 thus generates one or more cryptographic hash values 182, which the blockchain application 50 may incorporate into the block(s) 56 of data within the personal blockchain 54 as a personal or private usage repository or archive for any usage of the smartphone 24. Any block 56 of data may thus include the hash value 182 representing the privacy parameter 64. However, exemplary embodiments may also not hash the privacy parameter 64. That is, exemplary embodiments may additionally or alternatively tag the block 56 of data with the privacy parameter 64. The privacy parameter 64 may be any information, data, and/or metadata that is added to, appended to, or included within the block 56 of data to represent privacy. The privacy parameter 64, for example, may be a unique setting, flag, attribute, or file extension that indicates the block 56 of data is private.

Figure 18:
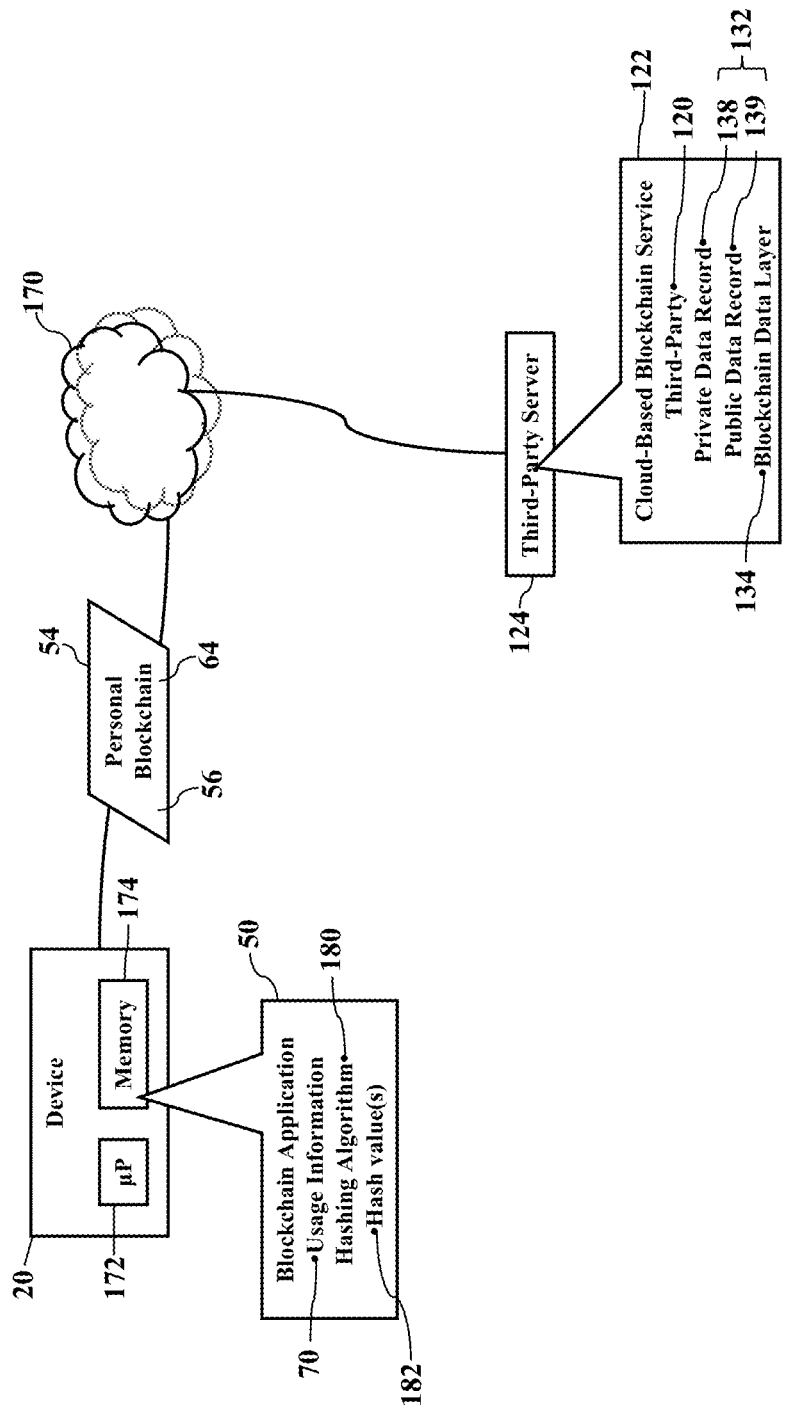

FIG. 18 illustrates the cloud-based blockchain service 122. Here the user's device 20 may send the personal blockchain 54 to the IP address associated with the third-party server 124 (via the communications network 170). When the third-party server 124 receives any of the blocks 56 of data associated with the personal blockchain 54, the third-party server 124 may provide the cloud-based blockchain service 122. The cloud-based blockchain service 122, for example, may publicly document any public portions of the personal blockchain 54. That is, the third-party server 124 may generate the private data records 138 and the public data records 139 within the blockchain data layer 134, perhaps based on the presence of the privacy parameter 64. The third-party server 124 may thus be called or termed a data layer server that generates the blockchain data layer 134, as later paragraphs will explain.

Figure 19:
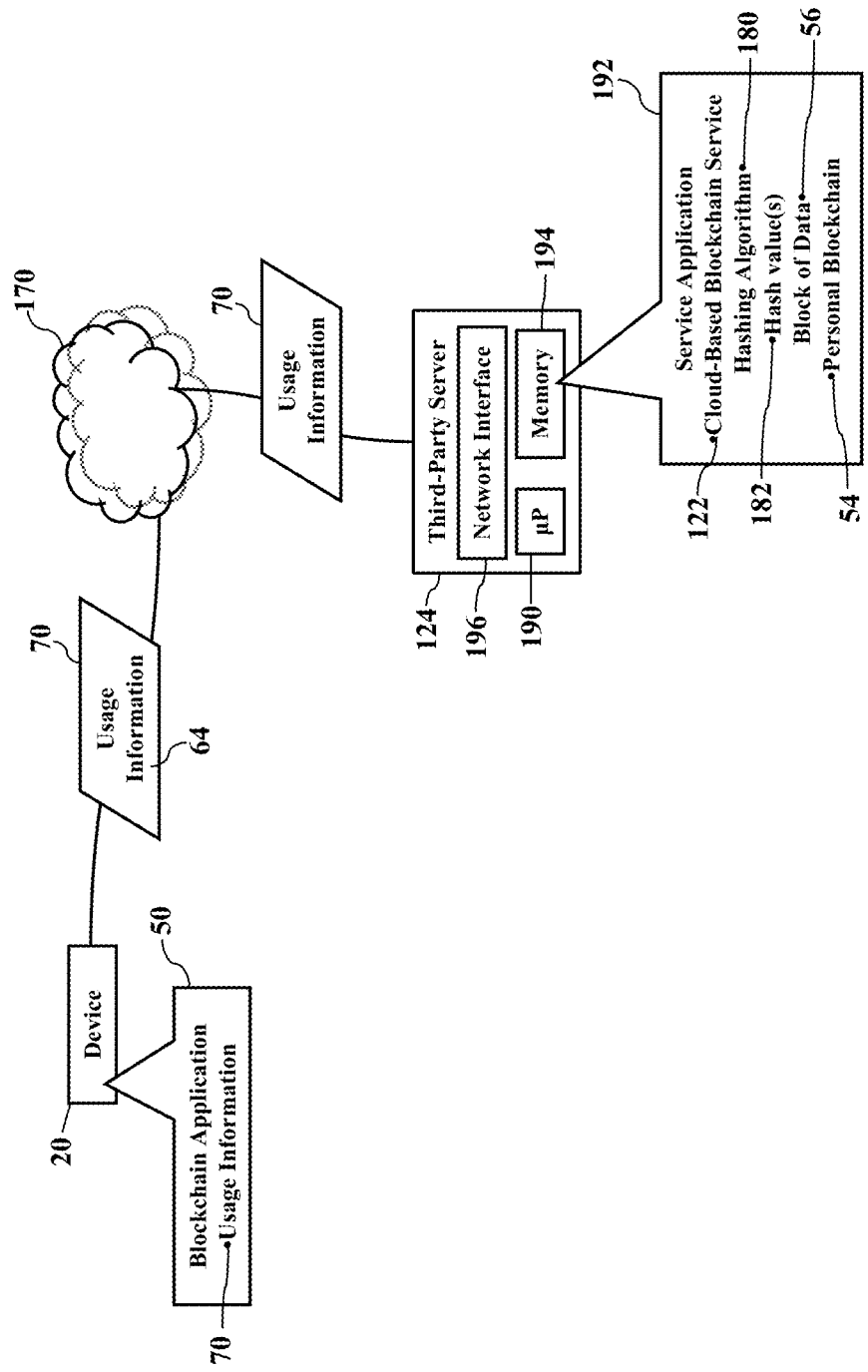

FIG. 19 also illustrates the cloud-based blockchain service 122. Here, though, exemplary embodiments may send or push the usage information 70 and/or the privacy parameter 64 to the cloud-based blockchain service 122. The blockchain application 50 (executed by the user's device 20) obtains the usage information 70 and/or the privacy parameter 64 and sends the usage information 70 and/or the privacy parameter 64 directly to the third-party server 124. The third-party server 124 then applies the cloud-based blockchain service 122 to the usage information 70 and/or to the privacy parameter 64. The third-party server 124 has a processor 190 (e.g., "μP"), application specific integrated circuit (ASIC), or other component that executes a service application 192 stored in a local, solid-state memory device 194. The third-party server 124 has a network interface 196 to the communications network 170, thus allowing two-way, bidirectional communication with the user's device 20. The service application 192 includes instructions, code, and/or programs that cause the third-party server 124 to perform operations, such as retrieving the usage information 70 and/or the privacy parameter 64 and calling, invoking, and/or applying an electronic representation of the hashing algorithm 180 to generate the one or more cryptographic hash values 182. The service application 192 may then incorporate the hash values 182 into the block(s) 56 of data within the personal blockchain 54 as a personal or private storage repository or archive for any usage of the smartphone 24.

The usage information 70 may be any device or network data. While the usage information 70 may be any electronic data or representation, the usage information 70 is likely binary data or values. The usage information 70 may represent names, text, biometric identification (e.g., fingerprint, Iris, and/or voice), Internet protocol address(es), domain name information, audio, video, image, web page, time, location (e.g., GPS), key or touch inputs (clickstream data), hardware serial numbers, cellular identifiers, and any other data or information describing an input or output. The usage information 70 may also include or represent any alphanumeric combination that uniquely identifies the smartphone 24, such as the smartphone's cellular telephone number (or CTN), International Mobile Subscriber Identity (or IMSI), or Mobile Station International Subscriber Directory Number (MSISDN).

Figure 20:
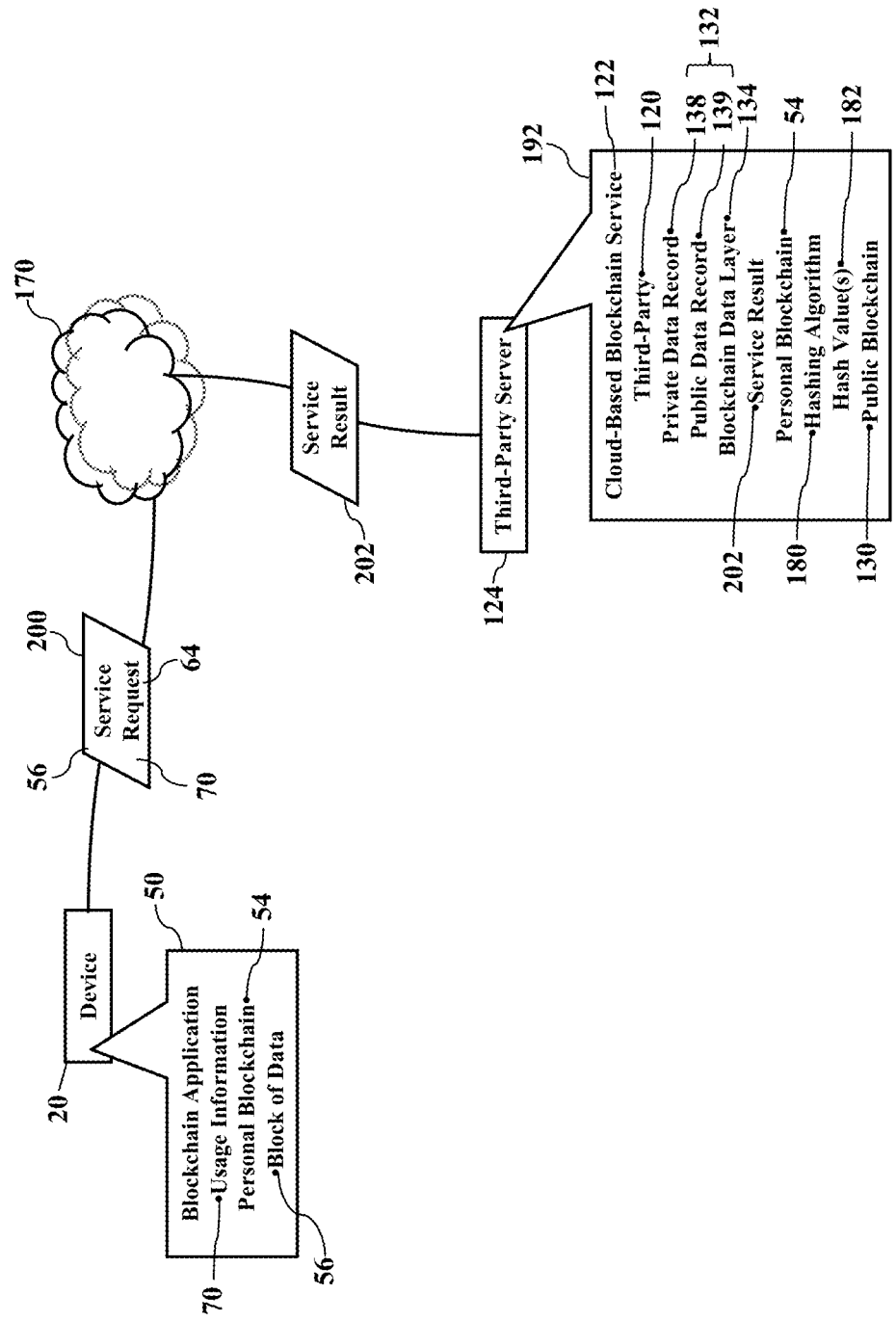

FIG. 20 illustrates a service mechanism. When the blockchain application 50 requires the cloud-based blockchain service 122, the blockchain application 50 instructs the user's device 20 to generate and send a service request 200 via the communications network 170 to the network address (such as an Internet protocol address) associated with the third-party server 124. The service request 200 may include the usage information 70, the privacy parameter 64, and/or any block(s) 56 of data in the personal blockchain 54. The service application 192 acts on the usage information 70, the privacy parameter 64, and/or any block(s) 56 of data to generate a service result 202 (such as a data record in the personal blockchain 54). The service application 192 may also create the private data records 138 and/or the public data records 139 associated with the blockchain data layer 134, perhaps based on the privacy parameter 64. The private data records 138 and the public data records 139 may comprise data or information representing the service request 200, a service result 202, and/or their corresponding hash values 182. Moreover, the service application 192 may itself call, invoke, and/or apply the electronic representation of the hashing algorithm 180 to the data records 132, which may or may not be incorporated into the public blockchain 130, based on the privacy parameter 64.

Exemplary embodiments may thus cooperate in a client/server fashion. The user's device 20 and the third-party server 124 may cooperate to send, receive, and/or generate the service request 200, the service result 202, and/or the data records 132 associated with the blockchain data layer 134. The blockchain application 50 and the service application 192 may likewise cooperate to send, receive, and/or generate the personal blockchain 54 and/or the public blockchain 130.

Figure 21:
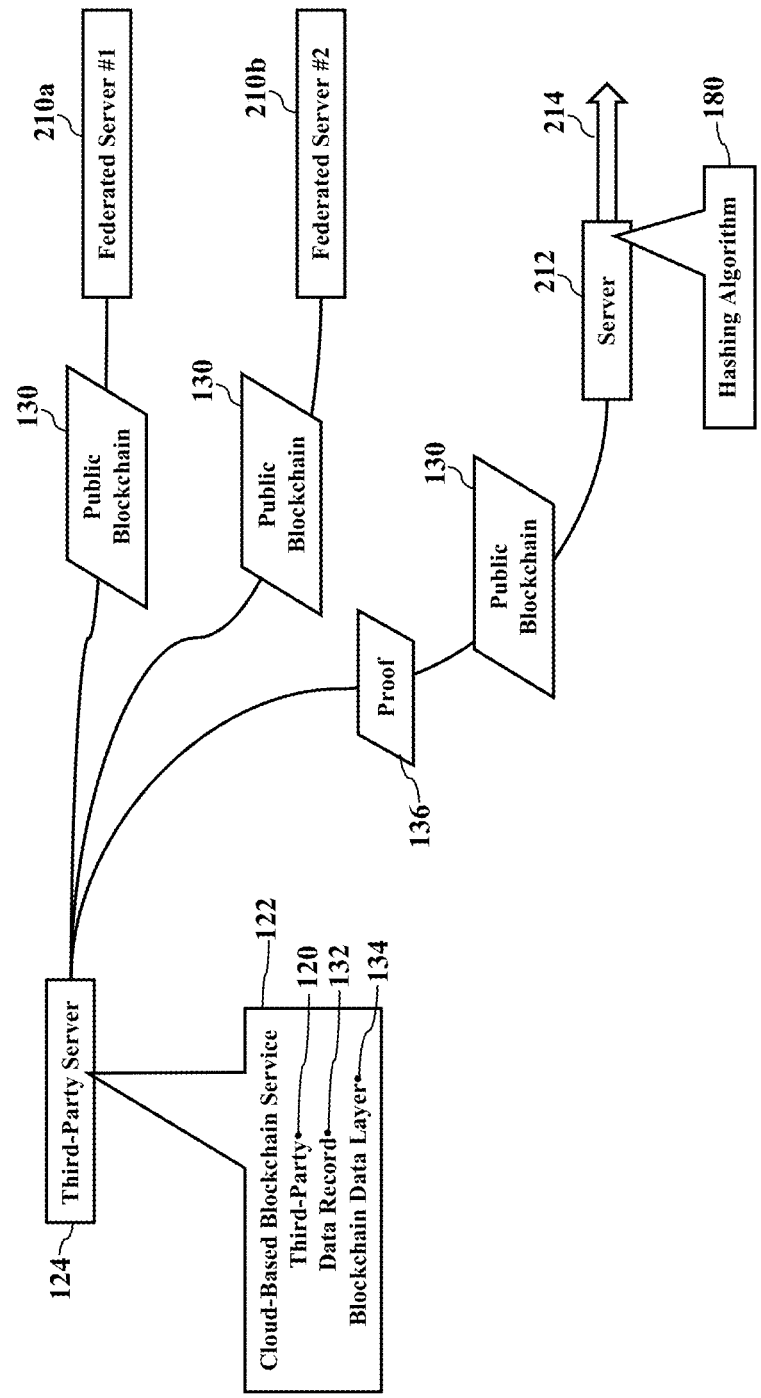

FIG. 21 illustrates additional publication mechanisms. Once the blockchain data layer 134 is generated, some of the blockchain data layer 134 may be published in a decentralized manner to any destination. The third-party server 124, for example, may generate and distribute the public blockchain 130 (via the communications network 170 illustrated in FIGS. 17-20) to one or more federated servers 210. While there may be many federated servers 210, for simplicity FIG. 21 only illustrates two (2) federated servers 210a and 210b. The federated servers 210a and 210b provide a service and, in return, they are compensated according to a compensation or services agreement or scheme.

Exemplary embodiments include still more publication mechanisms. For example, the cryptographic proof 136 and/or the public blockchain 130 may be sent (via the communications network 170 illustrated in FIGS. 17-20) to a server 212. The server 212 may then add another, third layer of cryptographic hashing (perhaps using the hashing algorithm 180) and generate another or second public blockchain 214. While the server 212 and/or the second public blockchain 214 may be operated by, or generated for, any entity, exemplary embodiments may integrate another cryptographic coin mechanism. That is, the server 212 and/or the second public blockchain 214 may be associated with BITCOIN®, ETHEREUM®, RIPPLE®, or other cryptographic coin mechanism. The cryptographic proof 136 and/or the second public blockchain 214 may be publicly distributed and/or documented as evidentiary validation. The cryptographic proof 136 and/or the second public blockchain 214 may thus be historically and publicly anchored for public inspection and review.

Exemplary embodiments may be applied regardless of networking environment. Exemplary embodiments may be easily adapted to stationary or mobile devices having cellular, wireless fidelity (WI-FI®), near field, and/or BLUETOOTH® capability. Exemplary embodiments may be applied to mobile devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may utilize any processing component, configuration, or system. Any processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations," this could include the processor performing the operations directly and/or facilitating, directing, or cooperating with another device or component to perform the operations.

Exemplary embodiments may packetize. When any device or server communicates via the communications network 170, the device or server may collect, send, and retrieve information. The information may be formatted or generated as packets of data according to a packet protocol (such as the Internet Protocol). The packets of data contain bits or bytes of data describing the contents, or payload, of a message. A header of each packet of data may contain routing information identifying an origination address and/or a destination address.

Figure 22:
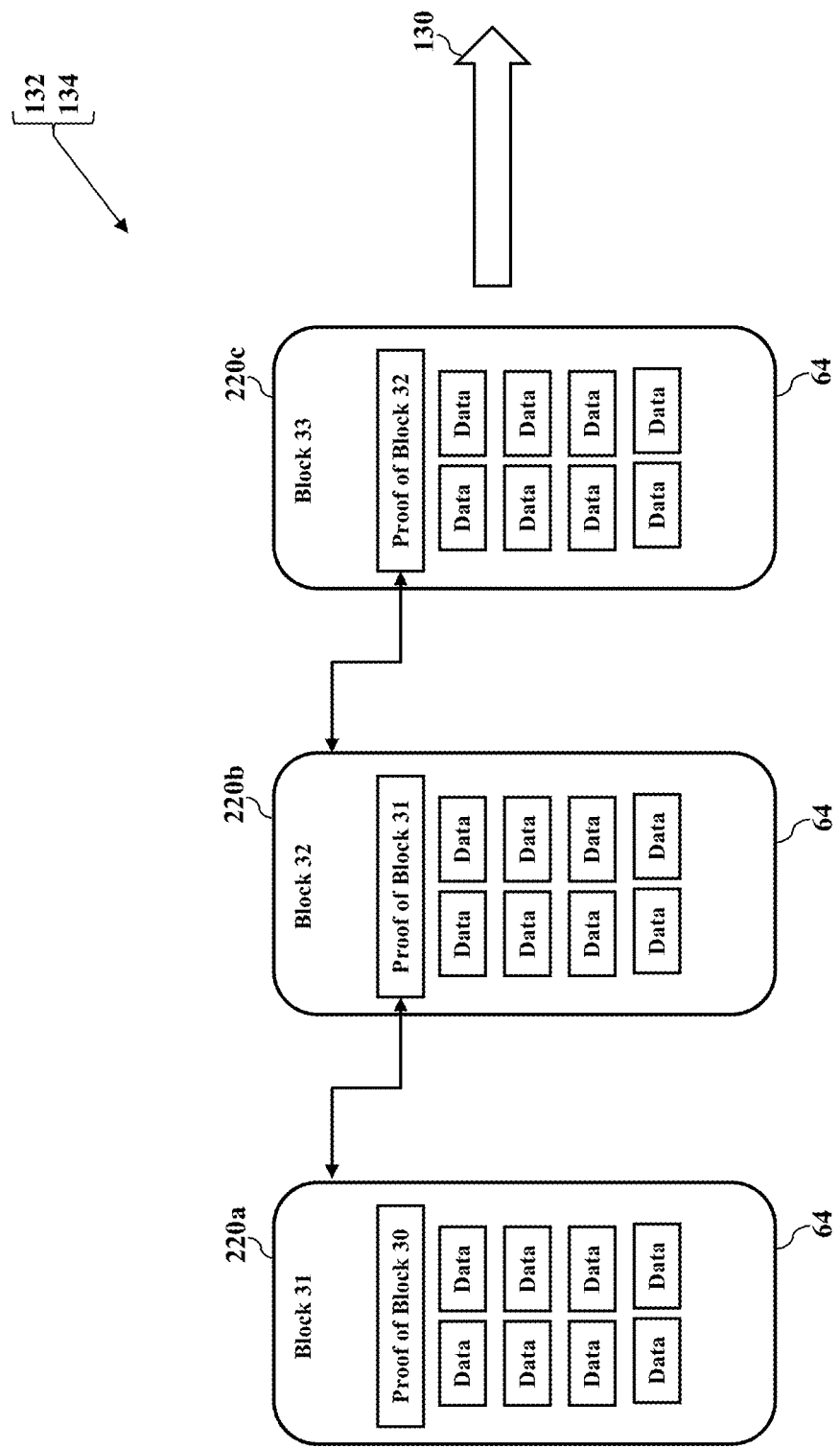
FIGS. 22-26 illustrate a blockchain data layer, according to exemplary embodiments.

FIGS. 22-26 further illustrate the blockchain data layer 134, according to exemplary embodiments. The blockchain data layer 134 may chain hashed directory blocks 220 of data into the public blockchain 130. For example, the blockchain data layer 134 accepts input data (such as the blocks 56 of data, the usage information 70, and/or the privacy parameter 64, as explained with reference to FIGS. 8-9 and 15-19) within a window of time. While the window of time may be configurable from fractions of seconds to hours, exemplary embodiments use ten (10) minute intervals. FIG. 22 illustrates a simple example of only three (3) directory blocks 220*a-c* of data, but in practice there may be millions or billions of different blocks. Each directory block 220 of data is linked to the preceding blocks in front and the following or trailing blocks behind. The links are created by hashing all the data within a single directory block 220 and then publishing that hash value within the next directory block. Each directory block 220 of data may further include or reference or specify the privacy parameter 64.

Figure 23:
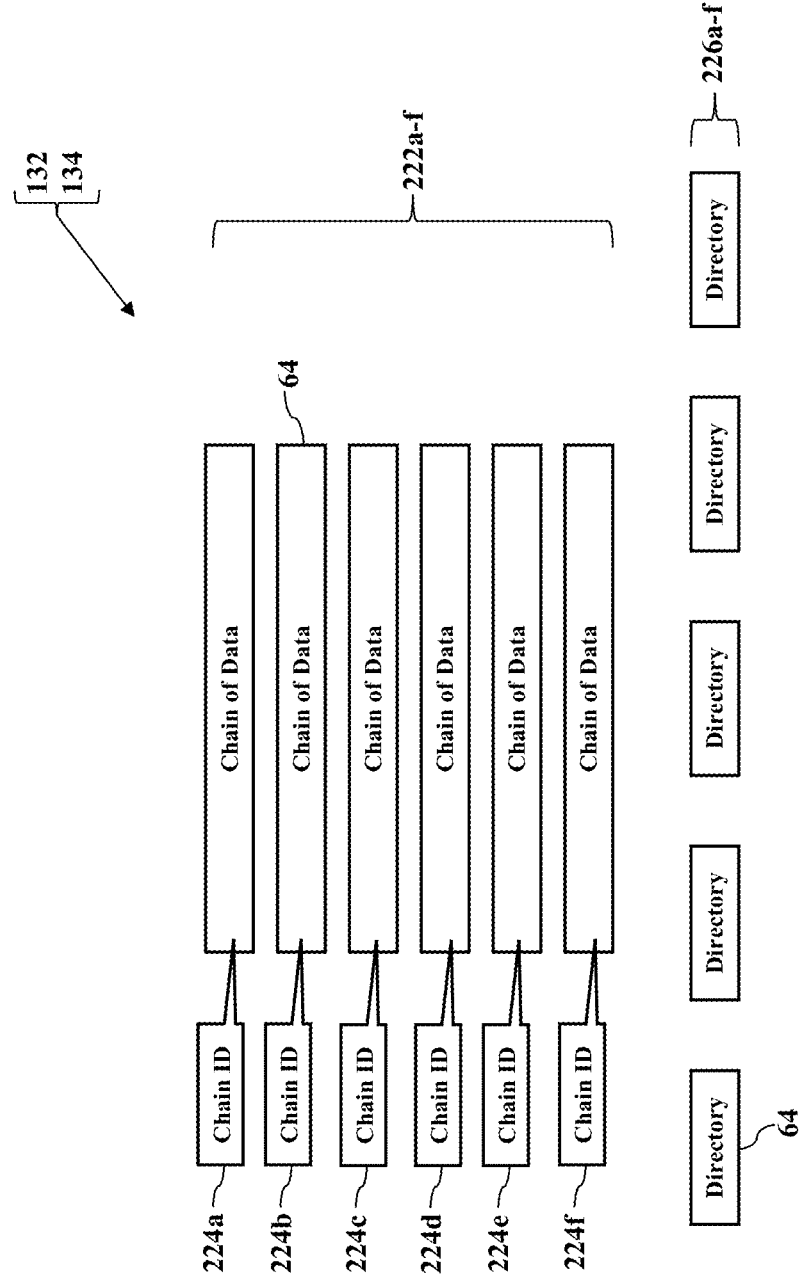

As FIG. 23 illustrates, published data may be organized within chains 222. Each chain 222 is created with an entry that associates a corresponding chain identifier 224. Each device 20 and/or each user, in other words, may have its/her corresponding chain identifier 224*a-d*. The blockchain data layer 134 may thus track any data associated with the entity with its corresponding chain identifier 224*a-d*. New and old data in time may be associated with, linked to, identified by, and/or retrieved using the chain identifier 224*a-d*. Each chain identifier 224*a-d* thus functionally resembles a directory 226*a-d* (e.g., files and folders) for organized data entries according to the entity. Each chain 222 and/or each directory 226 may further include or reference or specify the privacy parameter 64.

Figure 24:
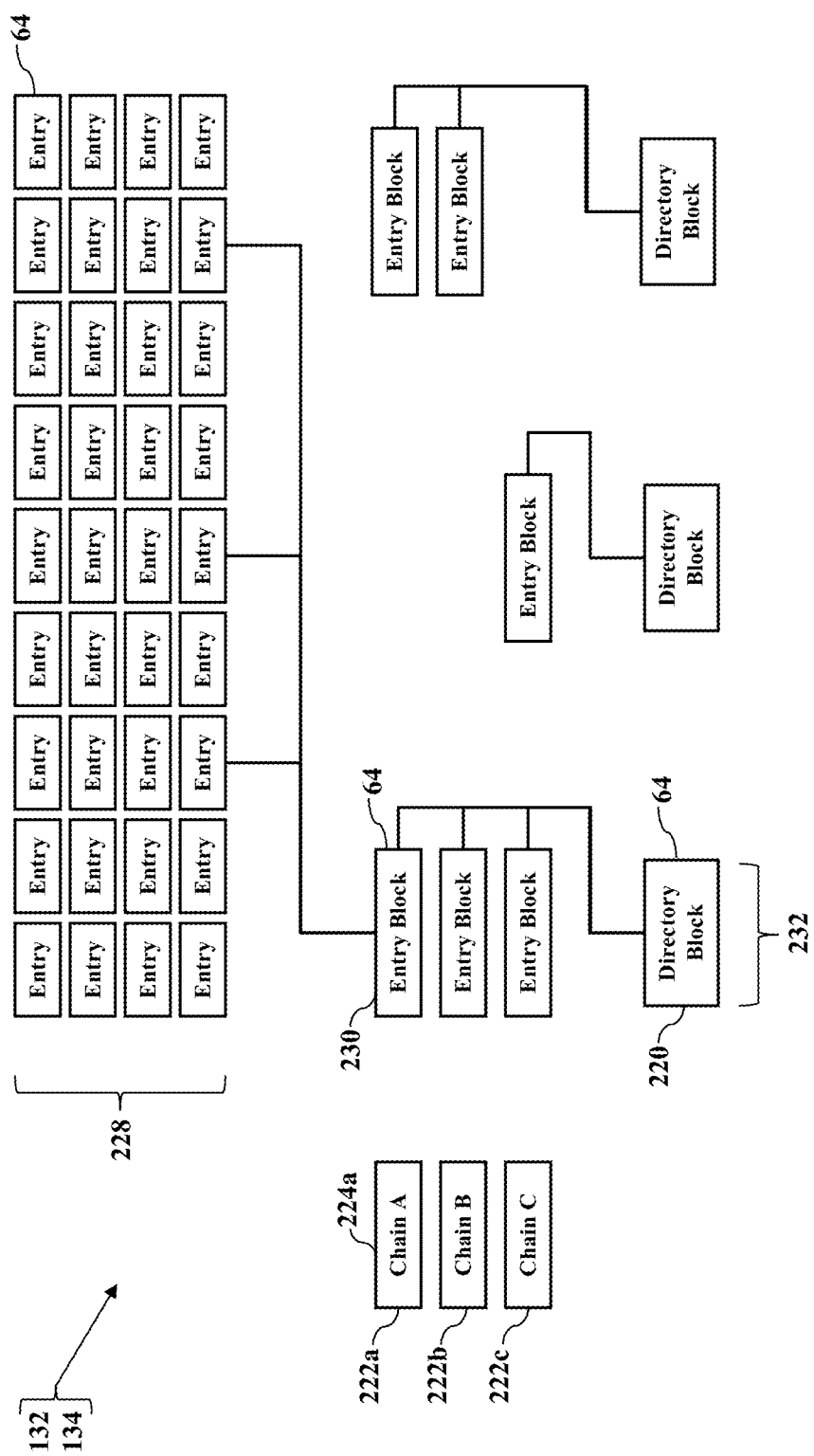

FIG. 24 illustrates the data records 132 in the blockchain data layer 134. As data is received as an input (such as the blocks 56 of data, the usage information 70, and/or the privacy parameter 64, as explained with reference to FIGS. 8-9 and 15-19), data is recorded within the blockchain data layer 134 as an entry 228. While the data may have any size, small chunks (such as 10 KB) may be pieced together to create larger file sizes. One or more of the entries 228 may be arranged into entry blocks 230 representing each chain 222 according to the corresponding chain identifier 224. New entries for each chain 222 are added to their respective entry block 230 (again perhaps according to the corresponding chain identifier 224). After the entries 228 have been made within the proper entry blocks 230, all the entry blocks 230 are then placed within in the directory block 220 generated within or occurring within a window 232 of time. While the window 232 of time may be chosen within any range from seconds to hours, exemplary embodiments may use ten (10) minute intervals. That is, all the entry blocks 230 generated every ten minutes are placed within in the directory block 220. Each entry 228, each entry block 230, and each directory block 220 may further include or reference or specify the privacy parameter 64.

Figure 25:
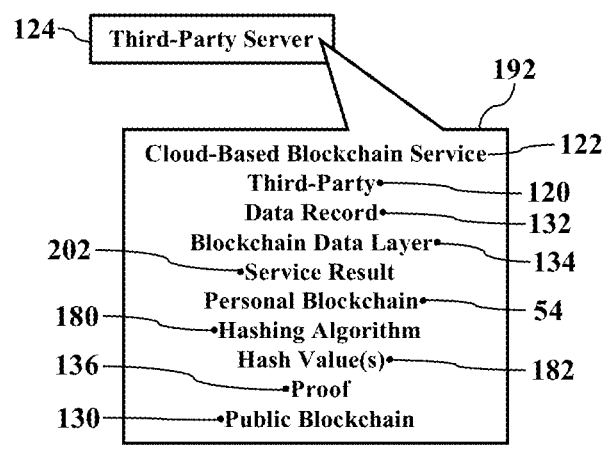

FIG. 25 illustrates cryptographic hashing. The third-party server 124 executes the service application 192 to generate the data records 132 in the blockchain data layer 134. The service application 192 may then instruct or cause the third-party server 124 to execute the hashing algorithm 180 on the data records 132 (such as the directory block 220 explained with reference to FIGS. 22-24). The hashing algorithm 180 thus generates one or more hash values 182 as a result, and the hash values 182 represent the hashed data records 132. As one example, the blockchain data layer 134 may apply a Merkle tree analysis to generate a Merkle root (representing a Merkle proof 136) representing each directory block 220. The third-party server 124 may then publish the Merkle proof 136 (as this disclosure explains).

Figure 26:
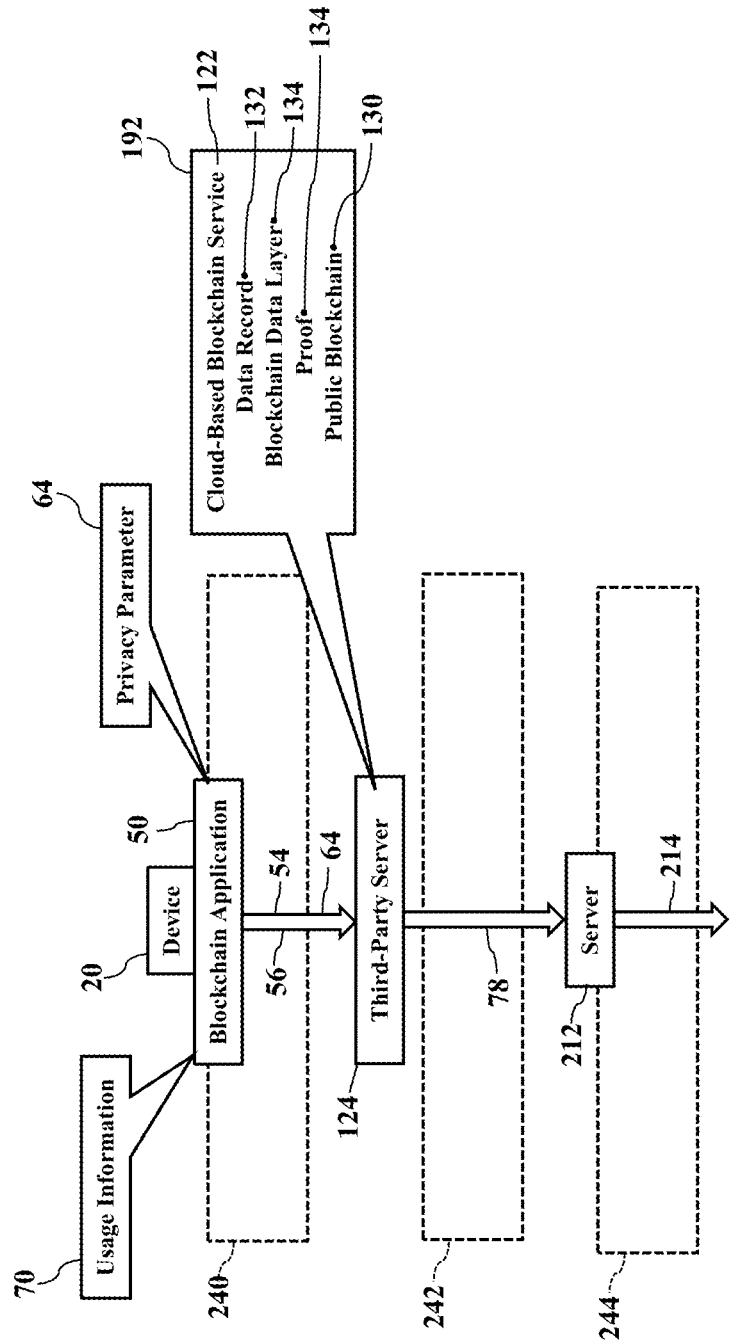

FIG. 26 illustrates hierarchical hashing. The blockchain application 50 may hash the usage information 70 and/or the privacy parameter 64 to provide a first layer 240 of cryptographic hashing and then generate the personal blockchain 54. Any blocks 56 of data within the personal blockchain 54 may be sent to a destination associated with the cloud-based blockchain service 122 (such as the third-party server 124). The third-party server 124 may thus execute the service application 192 to generate the data records 132 in the blockchain data layer 134. The third-party server 124 may optionally provide a second or intermediate layer 242 of cryptographic hashing to generate the cryptographic proof 136. The service application 192 may also publish any of the data records 132 as the public blockchain 130, perhaps depending on the privacy parameter 64. The cryptographic proof 136 may or may not also be published via the public blockchain 130, perhaps again based on the privacy parameter 64. The public blockchain 130 and/or the cryptographic proof 136 may be optionally sent to the server 212 as an input to yet another public blockchain 214 (again, such as BITCOIN®, ETHEREUM®, or RIPPLE®) for a third layer 244 of cryptographic hashing and public publication. The first layer 240 and the second layer 242 thus ride or sit atop a conventional public blockchain 214 (again, such as BITCOIN®, ETHEREUM®, or RIPPLE®) and provide additional public and/or private cryptographic proofs.

Exemplary embodiments may use any hashing function. Many readers may be familiar with the SHA-256 hashing algorithm. The SHA-256 hashing algorithm acts on any electronic data or information to generate a 256-bit hash value as a cryptographic key. The key is thus a unique digital signature. There are many hashing algorithms, though, and exemplary embodiments may be adapted to any hashing algorithm.

Figure 27:
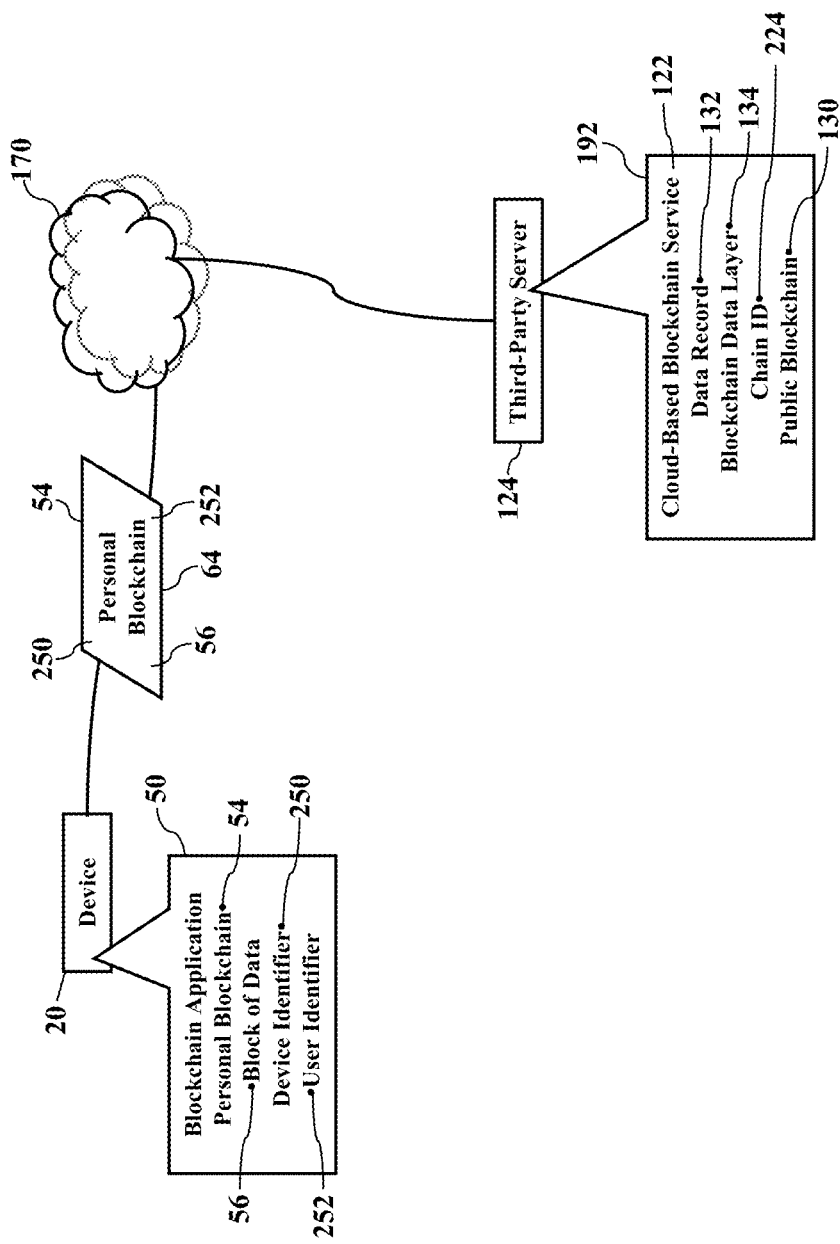
FIGS. 27-28 illustrate identifier mechanisms, according to exemplary embodiments.
Figure 28:
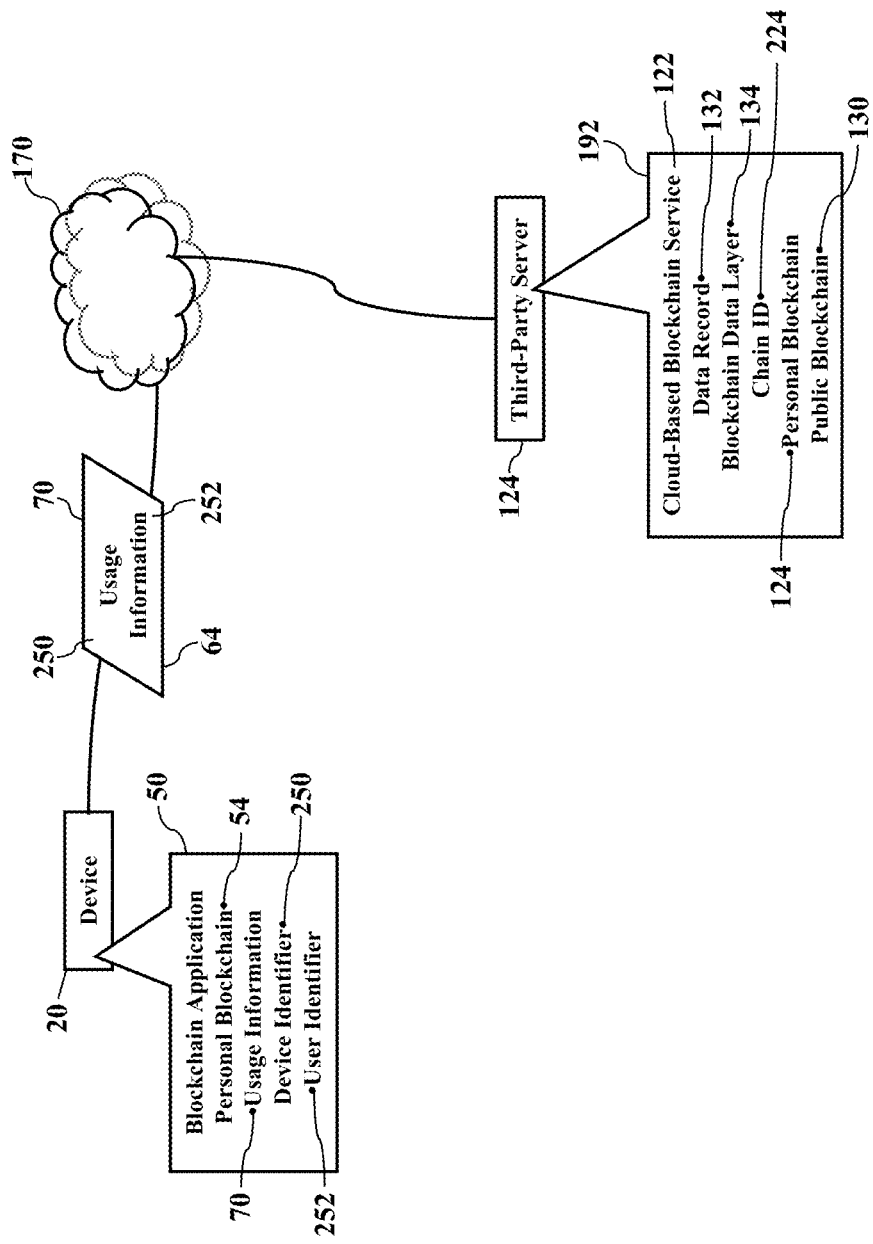

FIGS. 27-28 illustrate identifier mechanisms, according to exemplary embodiments. This disclosure already explained how each of the user's devices 20 may generate and send its device-specific, personal blockchain 54 to the third-party server 124 for the cloud-based blockchain service 122 (e.g., creation of the personal blockchain 54 and/or the blockchain data layer 134, as explained with reference to FIGS. 8-20). When any device 20 sends its respective blocks 56 of data in the device-specific personal blockchain 54, each device 20 may further identify itself. That is, the block 56 of data may include, contain, specify, or reference a corresponding device identifier 250. The device identifier 250 is any data or information that uniquely identifies the device 20 sending the block 56 of data. While the device identifier 250 may be any bit/binary value representing an alphanumeric combination, most readers are perhaps familiar with a cellular telephone number assigned to the device 20 by a cellular service provider. The device identifier 250, however, may additionally or alternatively include an IP address, hardware serial number, International Mobile Subscriber Identity (or IMSI), or Mobile Station International Subscriber Directory Number (MSISDN). Whatever the device identifier 250, exemplary embodiments may provide the device identifier 250 with any data, information, or packets of data (e.g., header or body) sent to the third-party server 124. As the third-party server 124 provides the cloud-based blockchain service 122 (such as generating the data records 132 in the blockchain data layer 134), exemplary embodiments may carry or notate the data records 132 with the device identifier 250. The device identifier 250, in other words, may be used to cross-reference or annotate the data records 132 with the chain identifier 224. Exemplary embodiments may thus generate and archive the data records 132 that correspond to each of the user's devices 20. Should exemplary embodiments then hash and incorporate the data records 132 into the public blockchain 130, the public blockchain 130 may also reference or associate with device identifier 250.

Exemplary embodiments may also assign a user identifier 252. Because the user may have multiple, different devices (as explained with reference to FIGS. 7-8), each one of the devices 20 may be commonly associated with a user account or user identifier 252. That is, even though each different device 20 may send its unique device identifier 250, the device 20 may also send the common user account or user identifier 252. The user account or user identifier 252, in other words, may be sent to accompany, or included within, the block 56 of data as any data, information, or packets of data (e.g., header or body) sent to the third-party server 124. While the user account or user identifier 252 may be any bit/binary value representing an alphanumeric combination, most readers are perhaps familiar with a username, password, email address, or login credential. Whatever the identifier 252, exemplary embodiments may provide the identifier 252 to the third-party server 124. As the third-party server 124 provides the cloud-based blockchain service 122 (such as generating the data records 132 in the blockchain data layer 134), exemplary embodiments may carry or notate the data records 132 with the user account or user identifier 252. The identifier 252, in other words, may be used to cross-reference or annotate the data records 132 with the chain identifier 224. Exemplary embodiments may thus generate and archive the data records 132 that correspond to the user (as represented by her user account or user identifier 252). Again, should exemplary embodiments then hash and incorporate the data records 132 into the public blockchain 130, the public blockchain 130 may also reference or associate her user account or user identifier 252.

FIG. 28 illustrates the usage information 70. This disclosure above explained how exemplary embodiments may send or push the usage information 70 to the third-party server 124 for the cloud-based blockchain service 122 (e.g., creation of the blockchain data layer 134, as explained with reference to FIG. 9). When any device 20 sends its respective usage information 70 and/or the privacy parameter 64, each device 20 may also identify itself using its corresponding device identifier 250. Moreover, exemplary embodiments may also identify the user account or user identifier 252. As the third-party server 124 provides the cloud-based blockchain service 122 (such as generating the data records 132 in the blockchain data layer 134), exemplary embodiments may carry or notate the data records 132 with the device identifier 250 and/or the user account or user identifier 252. The device identifier 250, in other words, may be used to cross-reference or annotate the data records 132 with the chain identifier 224. Exemplary embodiments may thus generate and archive the data records 132 that correspond to each user and her devices 20. Should exemplary embodiments then hash and incorporate the data records 132 into the personal blockchain 124 and/or the public blockchain 130, each blockchain 124 and 130 may also reference or associate the specific user and/or her specific device 20.

Figure 29:
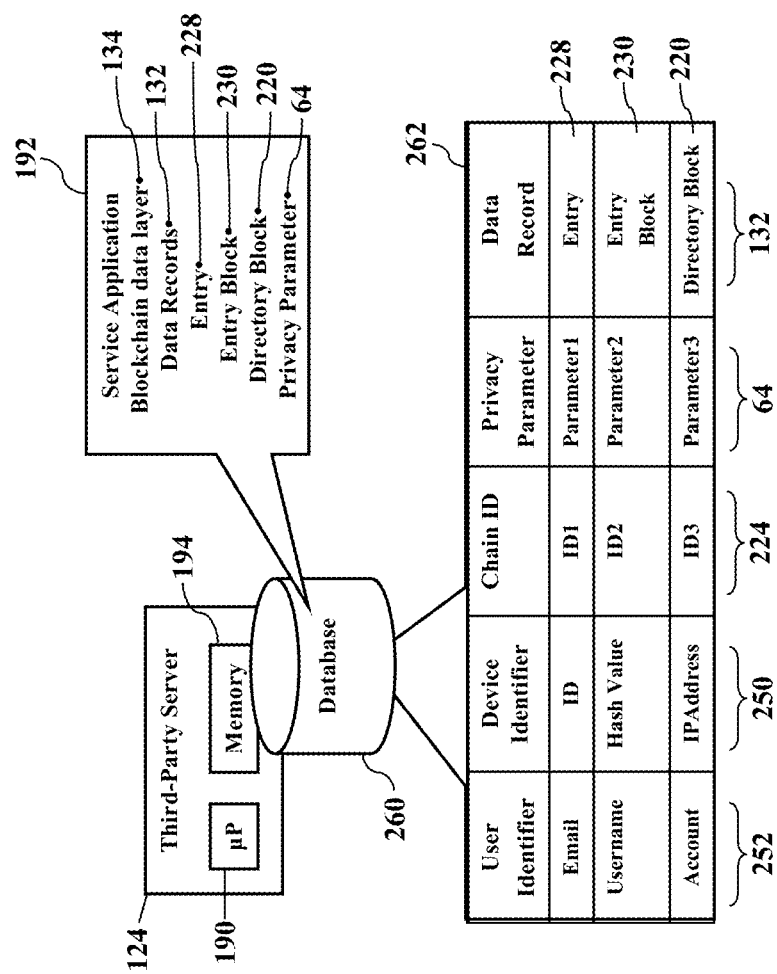
FIG. 29 further illustrates the blockchain data layer, according to exemplary embodiments.

FIG. 29 further illustrates the blockchain data layer 134, according to exemplary embodiments. As this disclosure previously explained, exemplary embodiments may generate the data records 132 representing the blockchain data layer 134 (such as the entries 228, entry blocks 230, and/or the directory blocks 220 explained with reference to FIGS. 22-24). This disclosure also explained how the data records 132 may reference, incorporate, or integrate the privacy parameter 64, the device identifier 250, and/or the user account or user identifier 252. As any data record 132 is generated, exemplary embodiments may archive the data record 132 in an electronic database 260. The electronic database 260 may thus define entries that identify the data records 132 and their corresponding privacy parameter 64, the user account or user identifier 252, the device identifier 250, and/or the chain identifier 224. While the electronic database 260 may have any logical structure, FIG. 29 illustrates the database 260 as a table 262 that maps, converts, or translates each data record 132 to its corresponding privacy parameter 64, the user account or user identifier 252, the device identifier 250, and/or the chain identifier 224. Once any entry is known, exemplary embodiments may then query for that entry to identify its corresponding entry. Exemplary embodiments may thus perform a database lookup operation to identify which entries are private and which entries are public and even retrieve related entries. The electronic database 260 may thus function or serve as a historical repository or archive that documents the blockchain data layer 134 according to the user and her multiple devices 20.

Exemplary embodiments represent a personal archive. As any data record 132 is generated, exemplary embodiments may reference the data record 132 in the electronic database 260. The cloud-based blockchain service 122 may thus also function as a query handler to receive queries from clients. A query may specify any query parameter and the cloud-based blockchain service 122 looks up and/or retrieves the corresponding entries. For example, a client submitting a query may specify the device identifier 250, and the cloud-based blockchain service 122 generates a query response that identifies all the data records 132 that are associated with the device identifier 250. If the query parameter specifies the user account or user identifier 252, then the cloud-based blockchain service 122 may identify all the data records 132 that are associated with the same user. Indeed, because the data records 132 may also be cataloged or logged according to time (such as the window 232 of time illustrated with reference to FIG. 24), the query parameter may further specify an interval of time to further narrow the search results. Regardless, the data records 132 may be quickly searched and retrieved to provide immutable evidence of usage. Some of the data records 132, though, may be associated with the privacy parameter 64, thus restricting their usage or eligible recipients.

Figure 30:
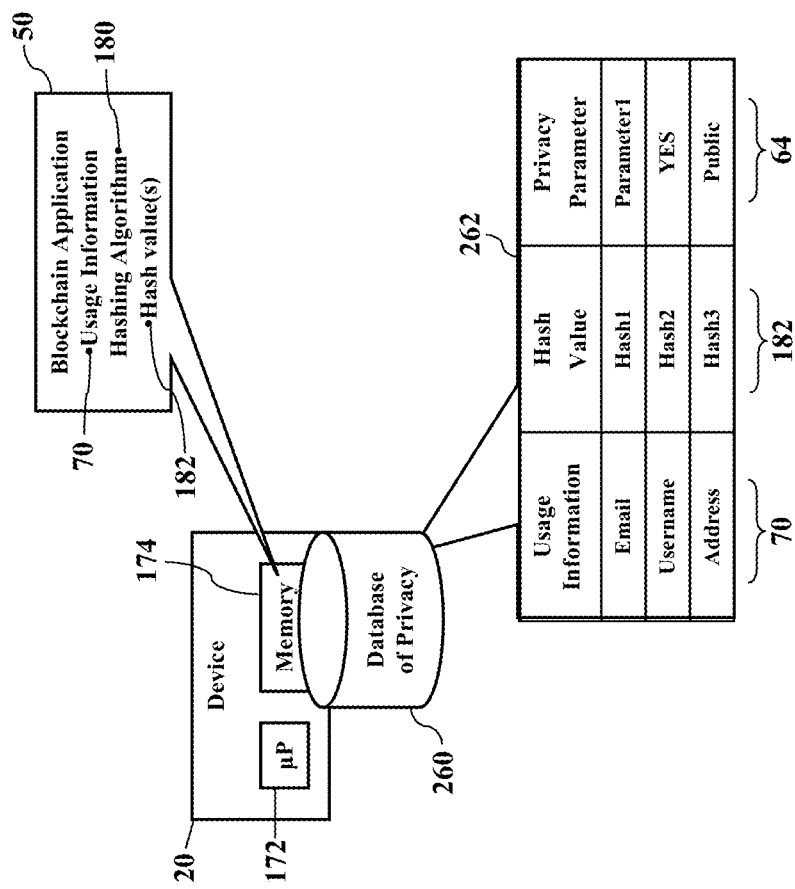
FIGS. 30-32 illustrate global privacy, according to exemplary embodiments.
Figure 31:
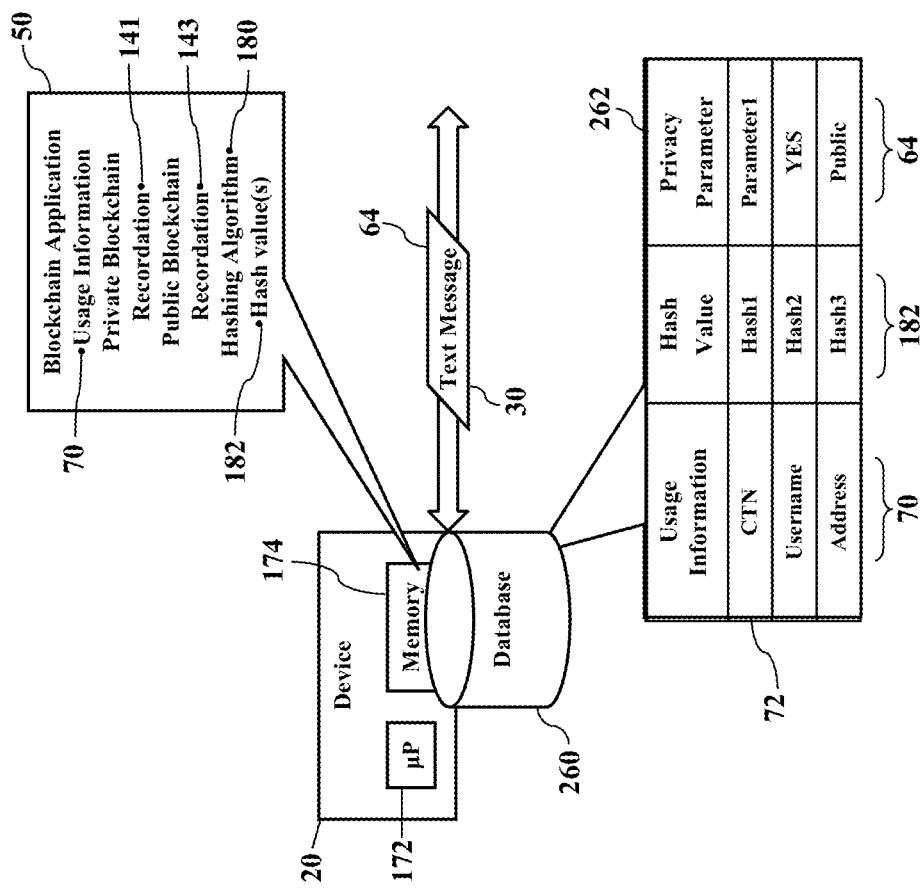
Figure 32:
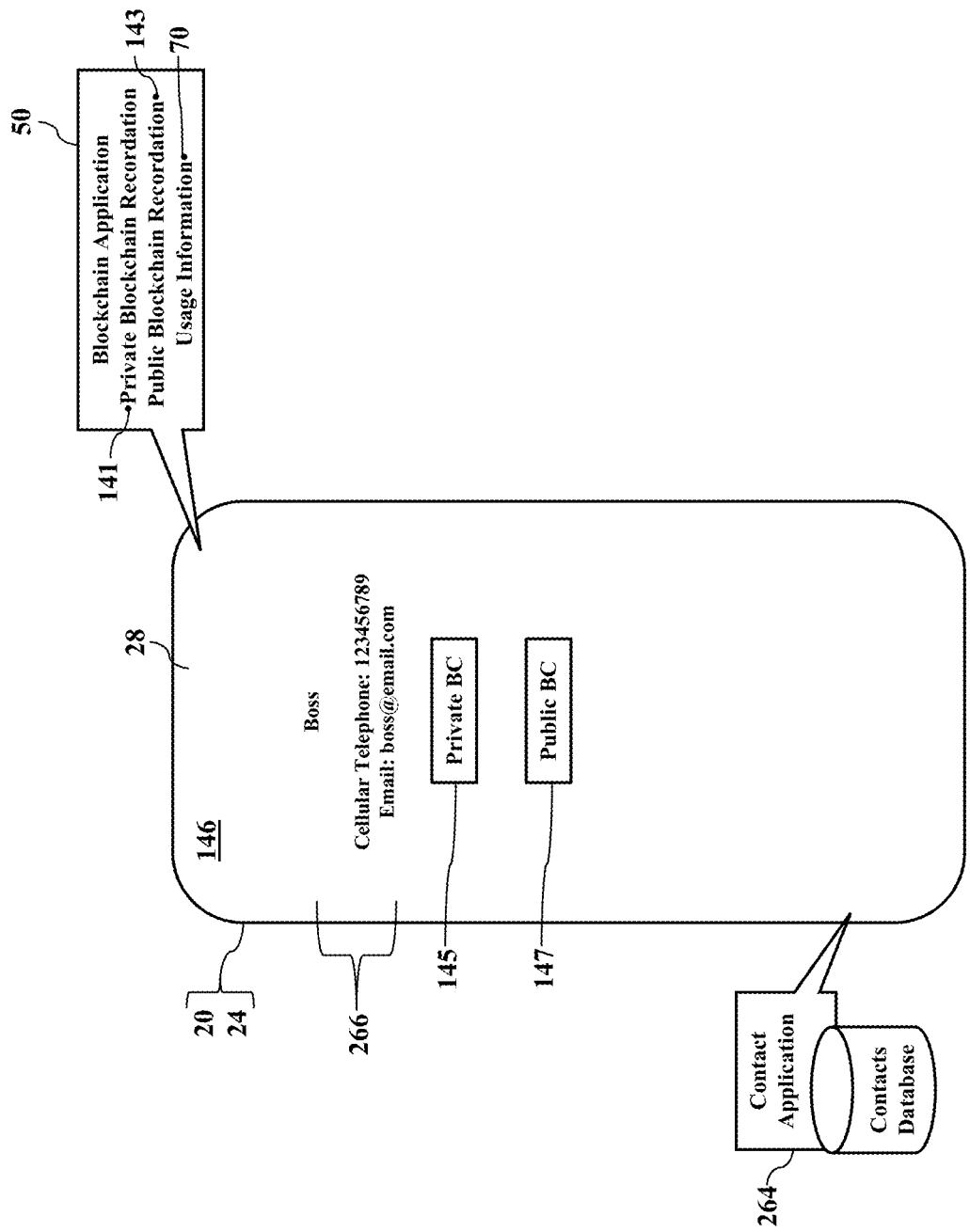

FIGS. 30-32 illustrate global privacy, according to exemplary embodiments. Here exemplary embodiments may be configured to always treat specific parties, or devices, as private. Suppose, for example, that the blockchain application 50 accesses the electronic database 260 of privacy. FIG. 30 illustrates the database 260 as being locally stored by the user's device 20, but the database 260 may be remotely stored and accessed via the communications network (illustrated as reference numeral 170 in FIGS. 17-20). The database 260 has entries to which the privacy parameter 64 is automatically applied. While the database 260 may have any structure, most readers may understand a relational mechanism. FIG. 30 illustrates the database 260 as the table 262 that maps, converts, or translates the usage information 70 to the privacy parameter 64. If any usage information 70 is matched to an entry in the table 262, then exemplary embodiments may automatically apply the privacy parameter 64. Exemplary embodiments may thus perform a database lookup operation to identify which usage information 70 is private and which usage information 70 is public.

FIGS. 31-32 illustrate a simple example of automatic privacy. Suppose the user commands the smartphone 24 to send the SMS text message 30 to the cellular identifier 72 (e.g., cellular telephone number or "CTN") associated with a recipient's device. When the blockchain application 50 collects the usage information 70, the blockchain application 50 may automatically query the database 260 for the usage information 70 describing the SMS text message 30. Because the table 262 contains an entry that matches the cellular identifier 72, exemplary embodiments infer that the private blockchain recordation 141 is desired. So, when exemplary embodiments collect the usage information 70 describing the SMS text message 30, exemplary embodiments may add, specify, or flag any of the usage information 70 with the privacy parameter 64. Exemplary embodiments may then generate the personal blockchain 54, as this disclosure above explained. However, because the recipient's cellular telephone number 72 is preconfigured for privacy, exemplary embodiments may decline or prohibit public disclosure (such as via the public blockchain 130, as explained with reference to FIGS. 9, 16, and 20-21).

Hash matching may also be used. When the blockchain application 50 collects the usage information 70, the blockchain application 50 may hash the usage information 70 (using the hashing algorithm 180) to generate the hash values 182. The blockchain application 50 may then query the electronic database 260 for any of the hash values 182. If any entry matches any hash value 182, then exemplary embodiments infer that the private blockchain recordation 141 is desired. However, if the database 260 fails to match the hash values 182, then exemplary embodiments infer that the public blockchain recordation 143 is desired.

FIG. 32 illustrates another privacy mechanism. As this disclosure above explains, the database 260 may be configured or loaded with recipients for which private blockchaining is always applied. The recipients may be identified using their cellular identifier 72, their email address, or any other communications address or identifier. However, a simple mechanism may associate the privacy parameter 64 to any individual contact. As the reader likely understands, the device 20 (again illustrated as the smartphone 24) may store and execute a contact application 264 that accesses a database of family, friends, and other contacts. When the smartphone 24 displays contact information 266 for a particular contact, exemplary embodiments may also generate and display contact configuration options (such as the private "BC" icon 145 and/or the public "BC" icon 147). If the user selects the private "BC" icon 145, then exemplary embodiments may privately blockchain any communications or messages to/from that same contact. In other words, any of the usage information 70 associated with the contact information 266 is processed for the private blockchain recordation 141. However, if the selects the public "BC" icon 147, then exemplary embodiments may process the usage information 70 associated with the contact information 266 for the public blockchain recordation 143. The graphical controls 145 and 147 may thus globally designate the contact as public or private, and the corresponding entries may be automatically added to the database 260.

Privacy may thus be automatically implemented. This disclosure above explained how the user's device 20 may identify itself using its corresponding device identifier 250. For example, when the device 20 sends its respective blocks 56 of data in the device-specific personal blockchain 54, the block 56 of data may include, contain, specify, or reference the corresponding device identifier 250. As the third-party server 124 provides the cloud-based blockchain service 122 (such as generating the data records 132 in the blockchain data layer 134), exemplary embodiments may thus carry or notate the data records 132 with the device identifier 250. The device identifier 250, in other words, may be used to cross-reference or annotate the data records 132 with the chain identifier 224.

The cloud-based blockchain service 122 may access the electronic database 260 of privacy. The third-party server 124 may locally store or access the database 260 of privacy as a portion of the cloud-based blockchain service 122. When the third-party server 124 receives the block 56 of data referencing the device identifier 250, the third-party server 124 may query the database 260 of privacy for the device identifier 250. Here the database 260 of privacy may have entries that map, relate, or associate the device identifier 250 to the privacy parameter 64. If a database entry matches the device identifier 250, then the third-party server 124 may identify its corresponding privacy parameter 64. The cloud-based blockchain service 122, in other words, may infer that the block 56 of data is preconfigured for private blockchaining.

The cloud-based blockchain service 122 may thus generate the private data records 138. Because the device identifier 250 is associated with private blockchaining (perhaps via the privacy parameter 64 identified in the database 260 of privacy), the third-party server 124 may generate the private data records 138 in the blockchain data layer 134. The third-party server 124 may also add the additional layer of cryptographic hashing to generate the cryptographic proofs 136, and the cryptographic proofs 136 may be incorporated into the personal blockchain 54. However, the cryptographic proofs 136 may not be incorporated into the public blockchain 130, in response to the privacy parameter 64. Indeed, the private data records 138 may be tagged with or include metadata indicating the privacy parameter 64 to help prevent public disclosure.

User-based privacy may also be automatically implemented. This disclosure above explained how the user's device 20 may send its unique device identifier 250 and the common user account or user identifier 252. The user account or user identifier 252, in other words, may be sent to accompany, or included within, the block 56 of data, perhaps as packet information or metadata. As the third-party server 124 provides the cloud-based blockchain service 122 (such as generating the data records 132 in the blockchain data layer 134), exemplary embodiments may thus additionally or alternatively carry or notate the data records 132 with the user identifier 252. The device identifier 250 and/or the user identifier 252, in other words, may be used to cross-reference or annotate the data records 132 with the chain identifier 224.

The cloud-based blockchain service 122 may access the electronic database 260 of privacy. When the third-party server 124 receives the block 56 of data referencing the device identifier 250 and/or the user identifier 252, the third-party server 124 may query the database 260 of privacy for either or both of the device identifier 250 and the user identifier 252. The database 260 of privacy may thus have entries that map, relate, or associate the device identifier 250 and/or the user identifier 252 to the privacy parameter 64. If a database entry matches either or both of the device identifier 250 and the user identifier 252, then the third-party server 124 may identify the corresponding privacy parameter 64. The cloud-based blockchain service 122, in other words, may infer that the block 56 of data is preconfigured for private blockchaining.

The cloud-based blockchain service 122 may thus generate the private data records 138. Because the device identifier 250 and/or the user identifier 252 is associated with private blockchaining (perhaps via the privacy parameter 64 identified in the database 260 of privacy), the third-party server 124 may generate the private data records 138 in the blockchain data layer 134. The third-party server 124 may also add the additional layer of cryptographic hashing to generate the cryptographic proofs 136, and the cryptographic proofs 136 may be incorporated into the personal blockchain 54. However, the cloud-based blockchain service 122 may be prohibited from incorporating the cryptographic proofs 136 into the public blockchain 130, in response to the privacy parameter 64. Indeed, the private data records 138 may be tagged with or include metadata indicating the privacy parameter 64 to help prevent public disclosure.

Chain-based privacy may also be automatically implemented. This disclosure above explained how the device 20, and/or the user, may have its/her corresponding chain identifier 224. For example, should the blockchain application 50 generate the personal blockchain 54, the personal blockchain 54 and/or any block 56 of data may include, specify, or reference the chain identifier 224, perhaps as packet information or metadata or a known or predetermined hash value. So, as the third-party server 124 provides the cloud-based blockchain service 122 (such as generating the data records 132 in the blockchain data layer 134), exemplary embodiments may thus additionally or alternatively carry or notate the data records 132 with the chain identifier 224. Indeed, exemplary embodiments may cross-reference the device identifier 250 and/or the user identifier 252 with the chain identifier 224, thus allowing any data record 132 to be annotated, identified, and retrieved.

The cloud-based blockchain service 122 may access the electronic database 260 of privacy. When the third-party server 124 receives the block 56 of data referencing any of the device identifier 250, the user identifier 252, and/or the chain identifier 224, the third-party server 124 may query the database 260 of privacy for either query parameter. The database 260 of privacy may thus have entries that map, relate, or associate the device identifier 250, the user identifier 252, and/or the chain identifier 224 to the privacy parameter 64. If a matching database entry is determined, then the third-party server 124 may identify the corresponding privacy parameter 64. The cloud-based blockchain service 122, in other words, may infer that the block 56 of data is preconfigured for private blockchaining.

The cloud-based blockchain service 122 may thus generate the private data records 138. Because any of the device identifier 250, the user identifier 252, and/or the chain identifier 224 is associated with private blockchaining (perhaps via the privacy parameter 64 identified in the database 260 of privacy), the third-party server 124 may generate the private data records 138 in the blockchain data layer 134.

The third-party server 124 may also add the additional layer of cryptographic hashing to generate the cryptographic proofs 136, and the cryptographic proofs 136 may be incorporated into the personal blockchain 54. However, the cloud-based blockchain service 122 may be prohibited from incorporating the cryptographic proofs 136 into the public blockchain 130, in response to the privacy parameter 64. Indeed, the private data records 138 may be tagged with or include metadata indicating the privacy parameter 64 to help prevent public disclosure.

Usage-based privacy may also be automatically implemented. Exemplary embodiments may apply private blockchaining based on the usage information 70. This disclosure above explained how exemplary embodiments may send or push the usage information 70 to the third-party server 124. When the third-party server 124 receives the usage information 70, here the third-party server 124 may consult the electronic database 260 of privacy. That is, the third-party server 124 may query the database 260 of privacy for any data or information described by, or included with, the usage information 70. The database 260 of privacy may thus have entries that map, relate, or associate the usage information 70 to the privacy parameter 64. If a matching database entry is determined, then the third-party server 124 may identify the corresponding privacy parameter 64. The cloud-based blockchain service 122, in other words, may infer that private blockchaining is authorized.

The cloud-based blockchain service 122 may thus generate the private data records 138. Because any of the device identifier 250, the user identifier 252, the chain identifier 224, and/or the usage information 70 may be associated with private blockchaining (perhaps via the privacy parameter 64 identified in the database 260 of privacy), the third-party server 124 may generate the private data records 138 in the blockchain data layer 134. The third-party server 124 may also add the additional layer of cryptographic hashing to generate the cryptographic proofs 136, and the cryptographic proofs 136 may be incorporated into the personal blockchain 54. However, the cloud-based blockchain service 122 may be prohibited from incorporating the cryptographic proofs 136 into the public blockchain 130, in response to the privacy parameter 64. Indeed, the private data records 138 may be tagged with or include metadata indicating the privacy parameter 64 to help prevent public disclosure.

The privacy parameter 64 may be unique to the user and/or to the device 20. The privacy parameter 64 may be a unique hash value that indicates private blockchaining. Suppose, for example, that the privacy parameter 64 is any alphanumeric combination that may be associated with private blockchaining. The user, for example, may select the privacy parameter 64 as a multi-character privacy phrase that uniquely indicates private blockchaining is desired. The cloud-based blockchain service 122, however, may select and assign the privacy parameter 64 (perhaps again as a multi-character text string). Regardless, exemplary embodiments may then hash the privacy parameter 64 to yield a unique, private hash value. Thereafter, whenever the private hash value is encountered, exemplary embodiments may apply private blockchaining. For example, the blockchain application 50 may instruct the device 20 to send the private hash value to the third-party server 124 providing the cloud-based blockchain service 122. The block 56 of data in the personal blockchain 54 may specify the private hash value, or the usage information 70 may specify the private hash value. Regardless, when third-party server 124 receives the block 56 of data and/or the usage information 70, the third-party server 124 may inspect either for the private hash value. The database 260 may thus be a simple list of different hash values for which the private blockchain recordation 141 is implemented (such as illustrated by FIG. 31). The third-party server 124 queries the database 260 for the private hash value. If the database 260 contains a matching entry, then the private blockchain recordation 141 is implemented. The cloud-based blockchain service 122, in other words, processes the block 56 of data or the usage information 70 to generate the private data records 138, as above explained. However, if the database 260 lacks or fails to contain a matching entry, then the block 56 of data or the usage information 70 may be eligible for the public blockchain recordation 143 via the public data records 139 and the public blockchain 130.

Figure 33:
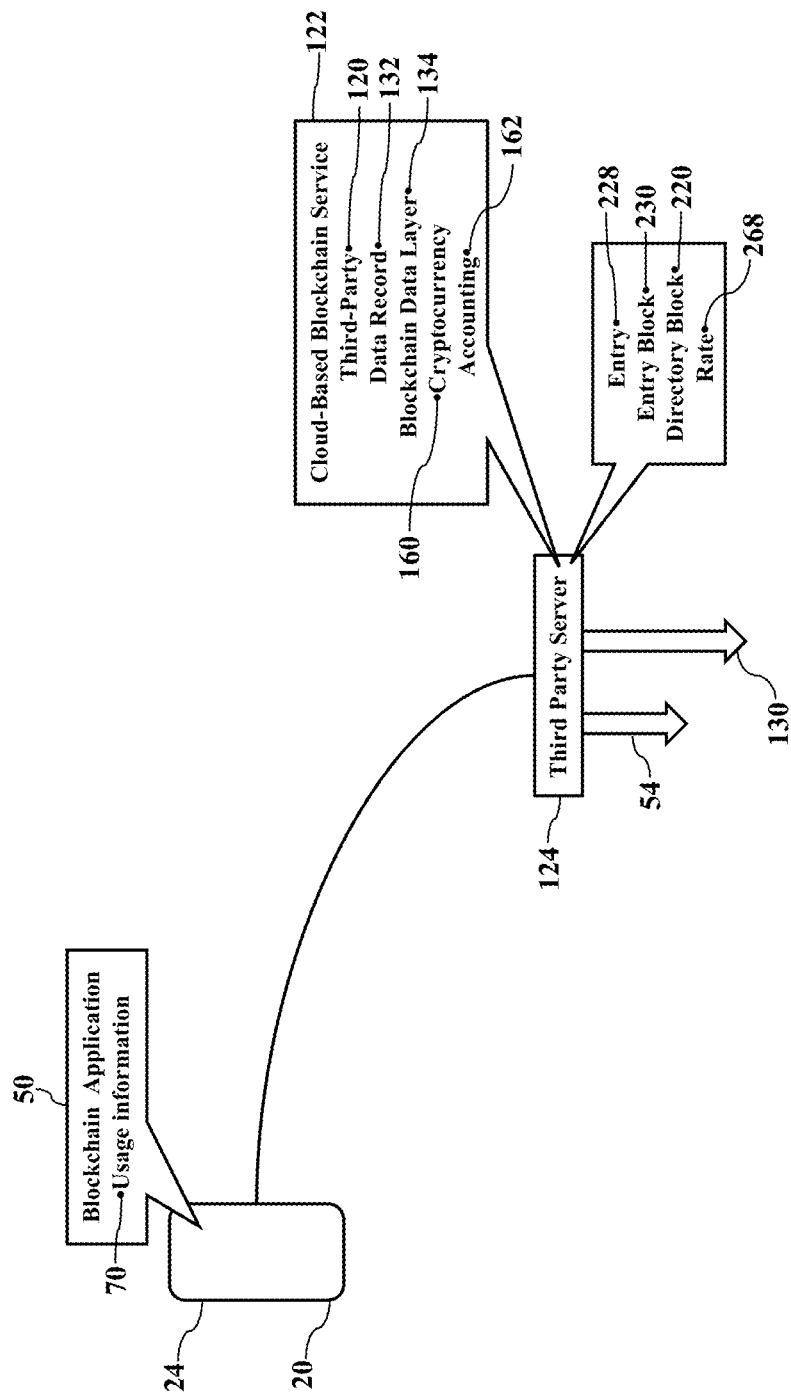
FIG. 33 illustrates a cryptocurrency micro-payment, according to exemplary embodiments

FIG. 33 further illustrates the cryptocurrency 160, according to exemplary embodiments. As this disclosure above explained, when the third-party server 124 provides the cloud-based blockchain service 122, the third-party 120 may be compensated. While the compensation may be a conventional currency, FIG. 33 illustrates the cryptocurrency 160. Here, though, the accounting 162 may be based on the data records 132 generated in the blockchain data layer 134. That is, exemplary embodiments may process a cryptographic fee based on the entries 228, entry blocks 230, and/or the directory blocks 220 generated within the blockchain data layer 134. That is, as the data records 132 are generated, exemplary embodiments may sum or count the entries 228, entry blocks 230, and/or the directory blocks 220 that are generated over time (such as per second, per minute, or other interval). The cloud-based blockchain service 122, for example, calls or initializes a counter having an initial value (such as zero). At an initial time, the counter commences or starts counting or summing the number of the entries 228, entry blocks 230, and/or the directory blocks 220 (generated within the blockchain data layer 134) that are commonly associated with or reference the same user account or user identifier 252, the same device identifier 250, and/or the same chain identifier 224. The counter stops counting or incrementing at a final time and/or when no more data records 132 are generated. Regardless, exemplary embodiments determine or read the final value or count. Exemplary embodiments may then sum or tally a total number of the data records 132 that were generated and perhaps even a rate 268 of generation (e.g., the sum or count over time). The accounting 162 may thus process a cryptofee based on the total number of the data records 132 and/or the rate 268 of generation within the blockchain data layer 134.

Figure 34:
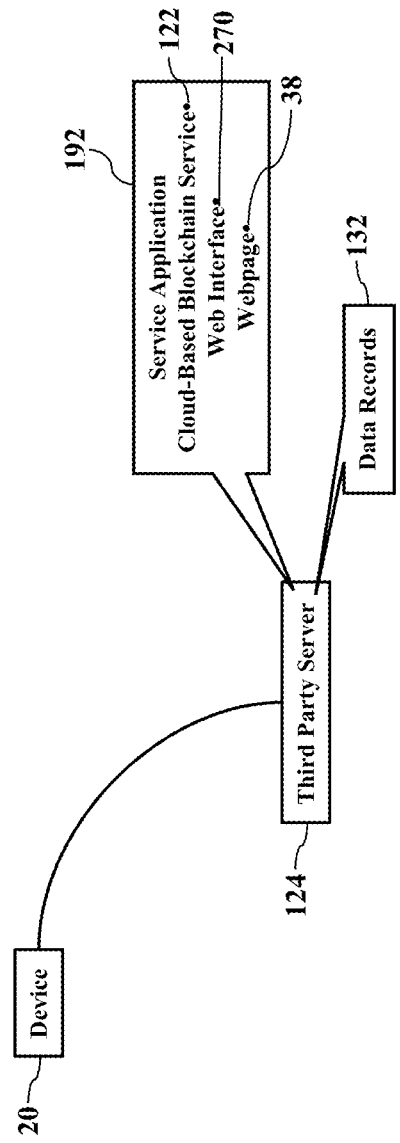
FIGS. 34-35 illustrate web access, according to exemplary embodiments.
Figure 35:
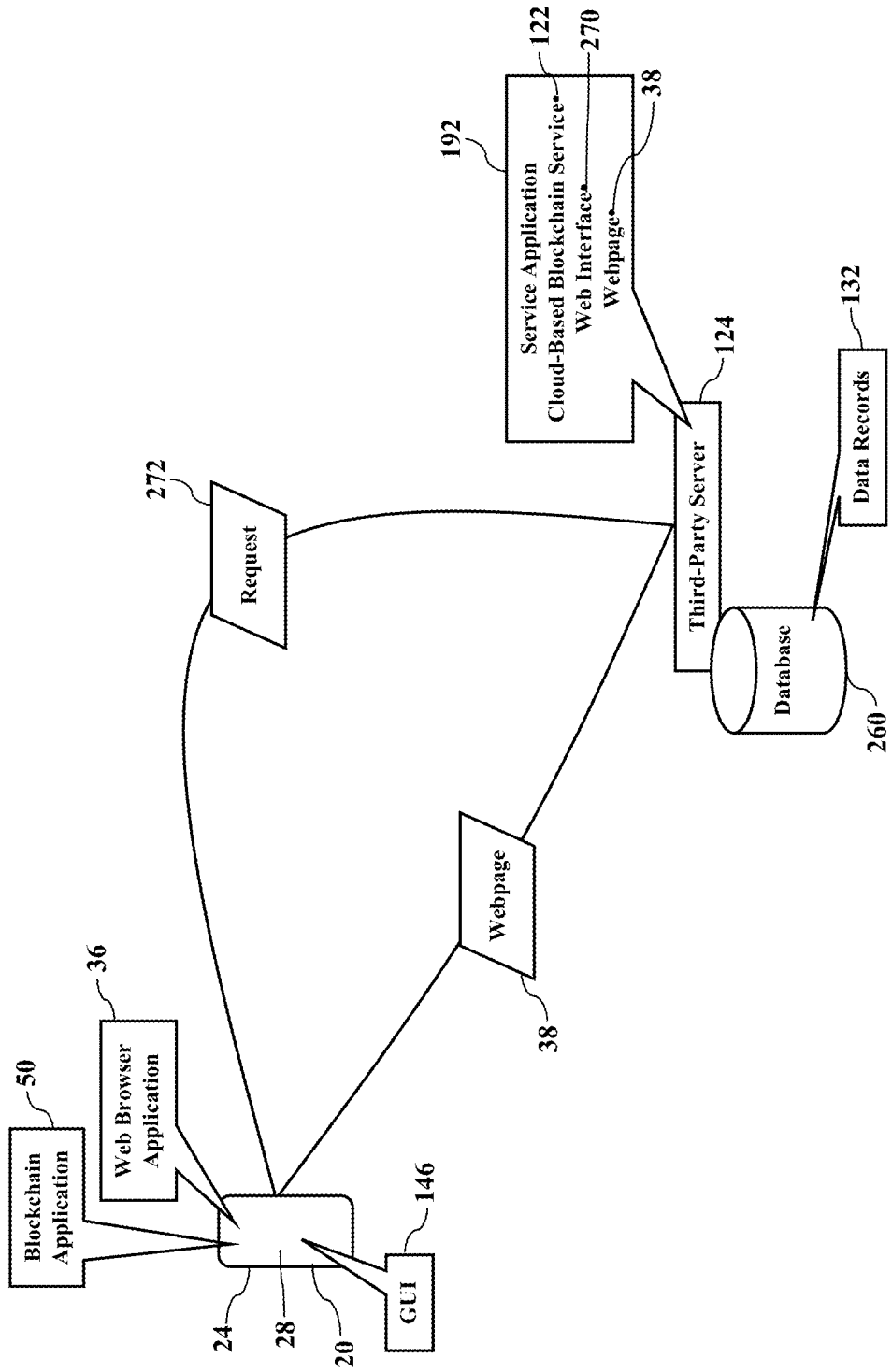

FIGS. 34-35 illustrate web access, according to exemplary embodiments. Here exemplary embodiments may be accessed and configured via the communications network 170 (such as the Internet, as illustrated with reference to FIGS. 17-20). FIG. 34 thus illustrates the service application 192 as a software-as-a-service offered by the third-party server 124. A user, in other words, may access the service application 192 to define the various parameters governing the private blockchaining provided by the cloud-based blockchain service 122. While exemplary embodiments may have any access mechanism, FIG. 34 illustrates a web interface 270. That is, the service application 192 may be accessed via the webpage 38. The webpage 38 prompts the user's device 20 to input or to select one or more parameters governing the cloud-based blockchain service 122.

FIG. 35 further illustrates the web interface 270. Again, as most readers are thought familiar with mobile computing, FIG. 35 again illustrates the user's smartphone 24 executing the blockchain application 50 and the web browser application 36. If the smartphone 24 correctly sends authentication credentials, then the smartphone 24 may utilize the web interface 270 to access the cloud-based blockchain service 122. The smartphone 24 executes the web browser application 36 to send a request 272 specifying an address or domain name associated with or representing the cloud-based blockchain service 122 and/or the third-party server 124. The web interface 270 to the third-party server 124 thus sends the webpage 38 as a response, and the user's smartphone 24 downloads the webpage 38. The blockchain application 50 and/or the web browser application 36 instructs the smartphone 24 to display the webpage 38 as the graphical user interface (or "GUI") 146 on its display device 28. The GUI 146 may generate one or more prompts or fields for specifying the parameters defining the cloud-based blockchain service 122. As one example, the webpage 38 may have prompts or fields for specifying a query parameter for searching the database 260.

Figure 36:
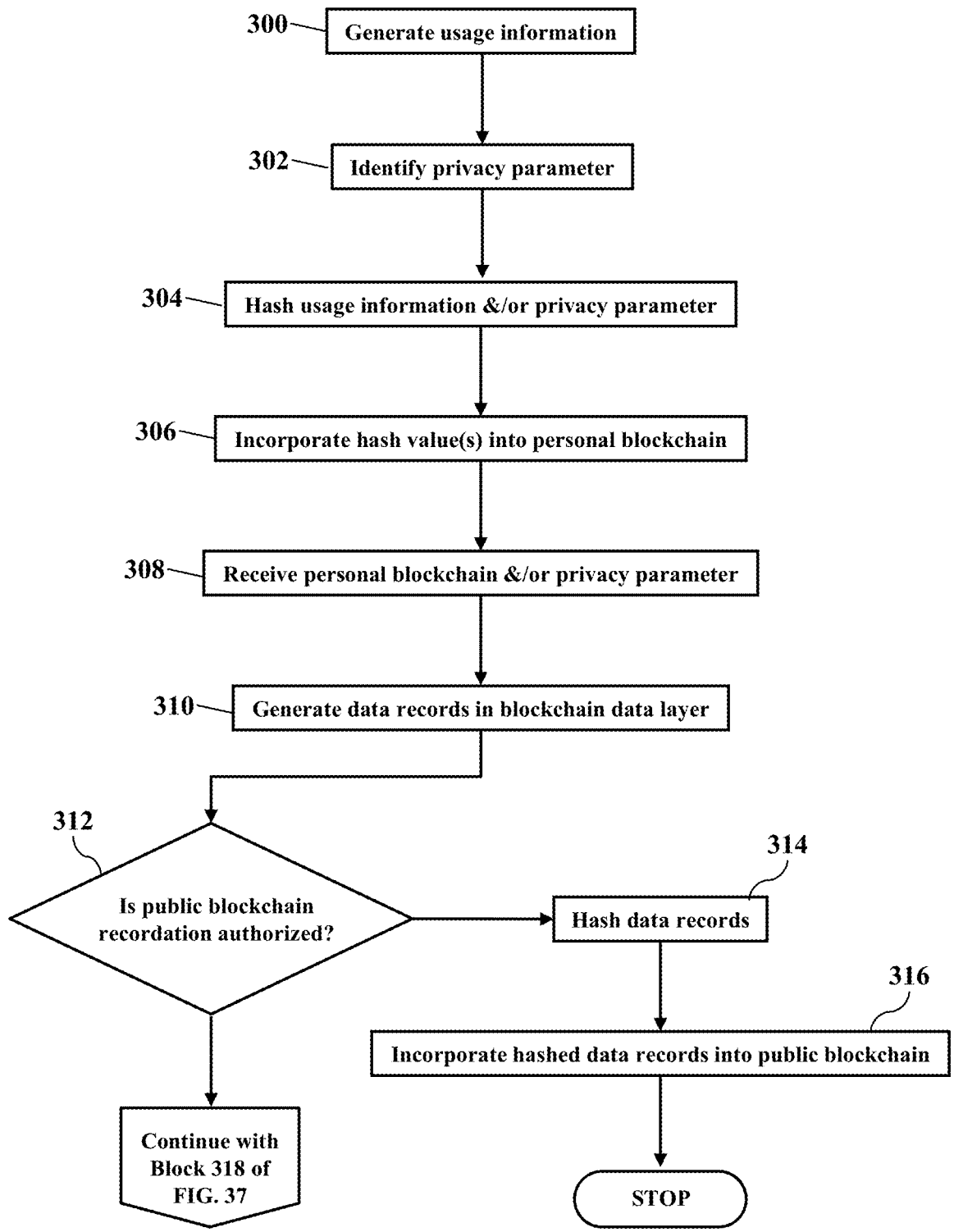
FIGS. 36-37 are flowcharts illustrating a method or algorithm for public/private service processing, according to exemplary embodiments.
Figure 37:
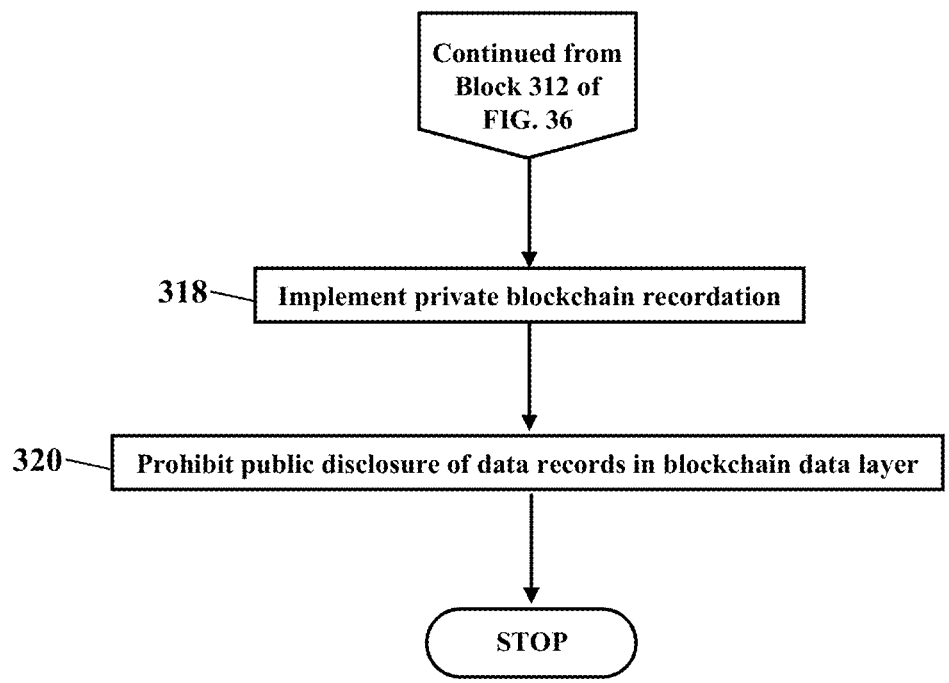

FIGS. 36-37 are flowcharts illustrating a method or algorithm for service processing, according to exemplary embodiments. The usage information 70 is generated (Block 300) and the privacy parameter 64 is identified (Block 302). The usage information 70 and/or the privacy parameter 64 is hashed (Block 304) and incorporated into the personal blockchain 54 (Block 306). The personal blockchain 54 and/or the privacy parameter 64 is received by the third-party server 124 (Block 308) and the data records 132 in the blockchain data layer 134 are generated (Block 310). If the public blockchain recordation 143 is authorized (Block 312), then the data records 132 in the blockchain data layer 134 may be hashed (Block 314) and incorporated into the public blockchain 130 (Block 316). However, if the public blockchain recordation 143 is not authorized (Block 312, then, as FIG. 37 illustrates, the private blockchain recordation 141 is authorized (Block 318) and public disclosure may be prohibited (Block 320).

Figure 38:
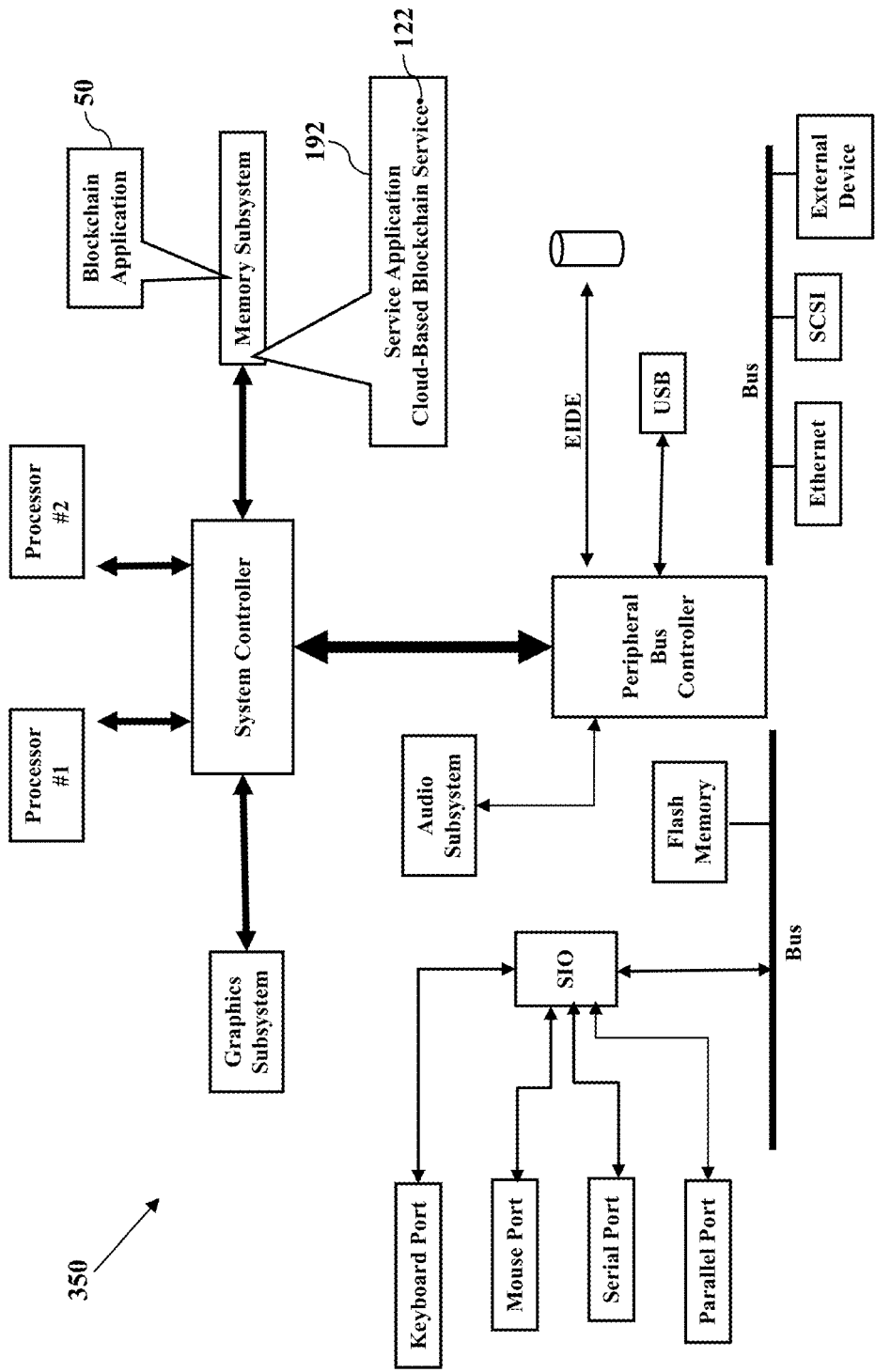
FIGS. 38-39 depict still more operating environments for additional aspects of the exemplary embodiments.

FIG. 38 is a schematic illustrating still more exemplary embodiments. FIG. 38 is a more detailed diagram illustrating a processor-controlled device 350. As earlier paragraphs explained, the blockchain application 50 and/or the service application 192 may partially or entirely operate in any mobile or stationary processor-controlled device. FIG. 38, then, illustrates the blockchain application 50 and/or the service application 192 stored in a memory subsystem of the processor-controlled device 350. One or more processors communicate with the memory subsystem and execute either, some, or all applications. Because the processor-controlled device 350 is well known to those of ordinary skill in the art, no further explanation is needed.

Figure 39:
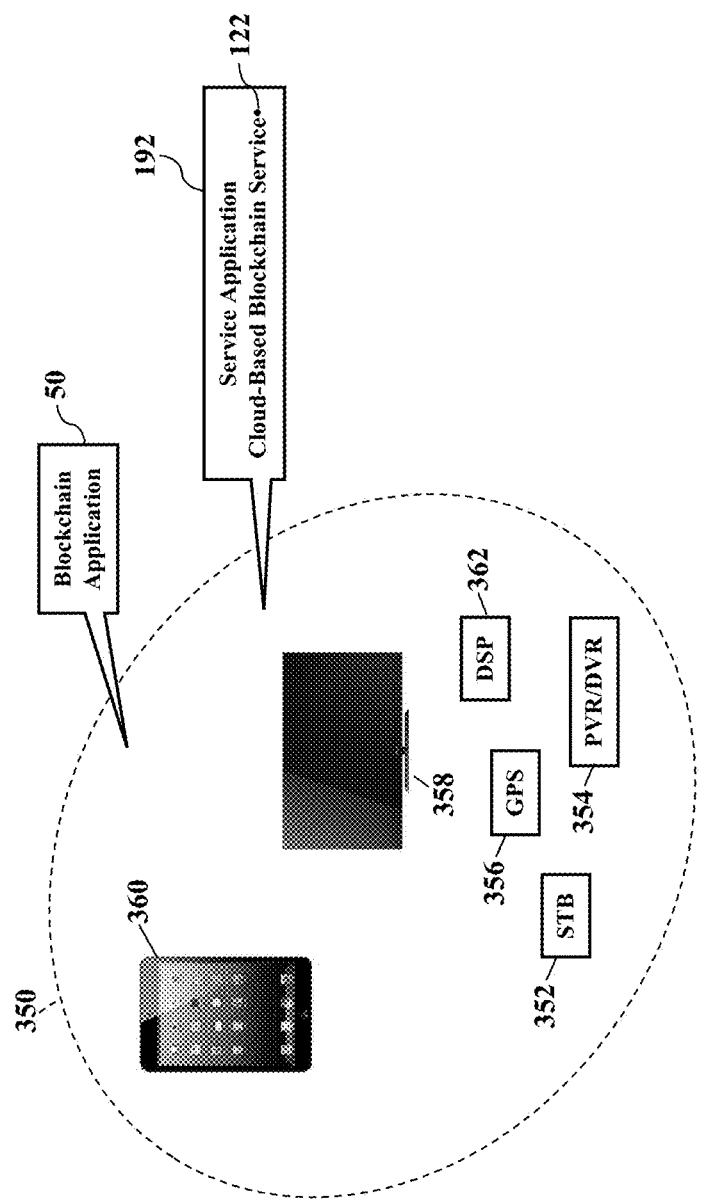

FIG. 39 depicts other possible operating environments for additional aspects of the exemplary embodiments. FIG. 39 illustrates the blockchain application 50 and/or the service application 192 operating within various other processor-controlled devices 350. FIG. 39, for example, illustrates that the blockchain application 50 and/or the service application 192 may entirely or partially operate within a set-top box ("STB") (352), a personal/digital video recorder (PVR/DVR) 354, a Global Positioning System (GPS) device 356, an interactive television 358, a tablet computer 360, or any computer system, communications device, or processor-controlled device utilizing any of the processors above described and/or a digital signal processor (DP/DSP) 362. Moreover, the processor-controlled device 350 may also include wearable devices (such as watches), radios, vehicle electronics, cameras, clocks, printers, gateways, mobile/implantable medical devices, and other apparatuses and systems. Because the architecture and operating principles of the various devices 350 are well known, the hardware and software componentry of the various devices 350 are not further shown and described.

Exemplary embodiments may be applied to any signaling standard. Most readers are thought familiar with the Global System for Mobile (GSM) communications signaling standard. Those of ordinary skill in the art, however, also recognize that exemplary embodiments are equally applicable to any communications device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard. Exemplary embodiments may also be applied to other standards, such as the I.E.E.E. 802 family of standards, the Industrial, Scientific, and Medical band of the electromagnetic spectrum, BLUETOOTH®, and any other.

Exemplary embodiments may be physically embodied on or in a computer-readable non-transitory storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for private processing in blockchain environments, as the above paragraphs explain.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A system for preventing a public disclosure of a short messaging service (SMS) message by providing a private blockchain recordation, comprising:
    a hardware processor;
    a display device; and
    a memory device storing a personal blockchain and instructions that, when executed by the hardware processor perform operations, the operations comprising:
    sending the SMS message to a recipient's identifier;
    recording the sending of the SMS message to a blockchain block of data associated with the personal blockchain, wherein the blockchain block of data comprises a usage information associated with the SMS message, the usage information comprising a sender's identifier and the recipient's identifier;
    after the recording of the sending of the SMS message to the blockchain block of data, displaying via the display device a private blockchain recordation icon associated with the SMS message for the private blockchain recordation;
    receiving a user's input that selects the private blockchain recordation icon associated with the SMS message for the private blockchain recordation;
    in response to the receiving of the user's input that selects the private blockchain recordation icon, identifying a blockchain privacy file extension that is associated with the private blockchain recordation;
    based on the receiving of the user's input, retrieving the usage information associated with the SMS message;
    generating a hash value by hashing the usage information associated with the SMS message;
    generating a modified blockchain block of data by incorporating the hash value into the blockchain block of data associated with the personal blockchain;
    appending the blockchain privacy file extension to the modified blockchain block of data; and
    sending the modified blockchain block of data with the appending of the blockchain privacy file extension via a communications network to a third party server;
    wherein the blockchain privacy file extension notates the modified blockchain block of data as a privacy mechanism to prevent the public disclosure of the SMS message.

2. The system of claim 1, wherein the memory device stores additional instructions that, when executed by the hardware processor, perform additional operations that further comprise associating the blockchain block of data to a device identifier.

3. The system of claim 1, wherein the memory device stores additional instructions that, when executed by the hardware processor, perform additional operations that further comprise accessing a message log, wherein the message log stores the SMS message sent to the recipient's identifier.

4. The system of claim 1, wherein the memory device stores additional instructions that, when executed by the hardware processor, perform additional operations that further comprise retrieving the blockchain privacy file extension.

5. The system of claim 1, wherein the memory device stores additional instructions that, when executed by the hardware processor, perform additional operations that further comprise generating a privacy hash value by hashing the blockchain privacy file extension.

6. The system of claim 1, wherein the memory device stores additional instructions that, when executed by the hardware processor, perform additional operations that further comprise associating the private blockchain recordation icon to the blockchain privacy file extension.

7. The system of claim 1, wherein the memory device stores additional instructions that, when executed by the hardware processor, perform additional operations that further comprise associating the blockchain block of data to the blockchain privacy file extension.

8. The system of claim 1, wherein the memory device stores additional instructions that, when executed by the hardware processor, perform additional operations that further comprise sending the modified blockchain block of data to a destination.

9. The system of claim 1, wherein the memory device stores additional instructions that, when executed by the hardware processor, perform additional operations that further comprise:
    querying an electronic database for the recipient's identifier; and
    identifying the privacy file extension electronically associated by the electronic database with the recipient's identifier.

* * * * *